(12) United States Patent
Sugahara et al.

(10) Patent No.: US 8,233,776 B2
(45) Date of Patent: *Jul. 31, 2012

(54) AFTER-RECORDING APPARATUS

(75) Inventors: Takayuki Sugahara, Yokosuka (JP);
Norihiko Fuchigami, Kamakura (JP);
Harukuni Kobari, Yokohama (JP);
Toshio Kuroiwa, Yokohama (JP)

(73) Assignee: Victor Company of Japan, Ltd.,
Yokohama (JP)

( * ) Notice: Subject to any disclaimer, the term of this patent is extended or adjusted under 35 U.S.C. 154(b) by 1327 days.

This patent is subject to a terminal disclaimer.

(21) Appl. No.: 11/902,652

(22) Filed: Sep. 24, 2007

(65) Prior Publication Data

US 2009/0028514 A1 Jan. 29, 2009

Related U.S. Application Data

(62) Division of application No. 10/244,475, filed on Sep. 17, 2002, now Pat. No. 7,289,718.

(30) Foreign Application Priority Data

Nov. 30, 2001 (JP) ................................. 2001-367614

(51) Int. Cl.
*H04N 5/917* (2006.01)
(52) U.S. Cl. .............. 386/328; 375/240.01; 375/E7.076
(58) Field of Classification Search .................. 386/328; 375/240.6, E7.076
See application file for complete search history.

(56) References Cited

U.S. PATENT DOCUMENTS 6,526,217 B1 * 2/2003 Fujinami ........................ 386/288
2002/0034144 A1 * 3/2002 Kotani ........................ 369/59.25

FOREIGN PATENT DOCUMENTS

| EP | 0 949 825 A1 | 10/1999 |
| EP | 1 065 665 A1 | 1/2001 |
| EP | 1 130 596 A2 | 9/2001 |
| EP | 1 198 132 A1 | 4/2002 |
| JP | 11-144378 | 5/1999 |
| JP | 11-259992 | 9/1999 |
| JP | 11-298845 | 10/1999 |
| JP | 2000-197005 | 7/2000 |
| WO | WO 99/31657 | * 6/1999 |
| WO | 01/82605 | 11/2001 |

* cited by examiner

*Primary Examiner* — Thai Tran
*Assistant Examiner* — Girumsew Wendmagegn
(74) *Attorney, Agent, or Firm* — Louis Woo

(57) ABSTRACT

An audio signal is compressively encoded into encoding-resultant audio data. A video signal is compressively encoded into encoding-resultant video data. An audio time stamp for audio-vide synchronous reproduction is added to every unit of the encoding-resultant audio data. A video time stamp for audio-video synchronous reproduction is added to every unit of the encoding-resultant video data. The time-stamp-added audio data and the time-stamp-added video data are multiplexed into main data. To a plurality of first after-recording-purpose data for at least one of (1) the encoding-resultant audio data and (2) the encoding-resultant video data which form the main data, time stamps for reproduction synchronous with a portion of the main data and identification information for identifying the plurality of first after-recording-purpose data are added to convert the first after-recording-purpose data into second after-recording-purpose data. The second after-recording-purpose data are made into bit streams without being multiplexed with the main data.

1 Claim, 16 Drawing Sheets

FIG. 10

GENERAL_IFO table

| Syntax | NO. of bits |
| --- | --- |
| GENERAL_IFO() { | |
|     system_id | 32 |
|     TMG_IFO_length | 32 |
|     Version | 8 |
|     HDD_number | 8 |
|     num_of_PR_IFO | 8 |
|     num_of_PL_IFO | 8 |
|     start_address_of_PR_IFO | 32 |
|     start_address_of_PL_IFO | 32 |
| } | |

FIG. 12

PROG_IFO table

| Syntax | NO. of bits |
| --- | --- |
| PROG_IFO() { | |
|   Size of PROG_IFO | 32 |
|   PR number | 8 |
|   Playback Time | 32 |
|   Num of INDEX | 8 |
|   Rec Date | 32 |
|   Rec Time | 24 |
|   reserved | 4 |
|   Character Set | 4 |
|   PR text information_size | 8 |
|   for(i=0; i<PR text information_size; i++) { | |
|     PR_text_information | 8 |
|   } | |
|   Content type | 8 |
|   Component type | 8 |
|   V_ATR | 16 |
|   A_ATR | 16 |

FIG. 13

PLAYL_IFO table

| Syntax | NO. of bits |
|---|---|
| PLAYL_IFO() { | |
|   Size of PLAYL_IFO | 32 |
|   PL number | 8 |
|   Playback Time | 32 |
|   PR_number | 8 |
|   AF_number | 8 |
|   Making_Date | 32 |
|   Making_Time | 24 |
|   reserved | 8 |
|   Character Set | 4 |
|   PL text information_size | 8 |
|   for(i=0; i<PR text information_size; i++) { | |
|     PL_text_information | 8 |
|     } | |

FIG. 14

INDEX_IFO table

| Syntax | NO. of bits |
|---|---|
| INDEX_IFO() { | |
|   INDEX_number | 8 |
|   Playback_time | 40 |
|   Start Address | 64 |
|   End Address | 64 |
| } | |

AFTER-RECORDING APPARATUS

CROSS REFERENCE TO RELATED APPLICATIONS

This application is a divisional of U.S. application Ser. No. 10/244,475 filed Sep. 17, 2002, now U.S. Pat. No. 7,289,718 and claims priority from JP application No. 2001-367614 filed Nov. 30, 2001.

BACKGROUND OF THE INVENTION

1. Field of the Invention

This invention relates to an after-recording apparatus or a dubbing-in apparatus which is designed to post-record, for example, an audio signal in connection with main data including audio data and video data. In addition, this invention relates to a computer program, a recording medium, a transmission method, and a reproducing apparatus.

2. Description of the Related Art

Japanese patent application publication number 11-144378/1999 discloses a method of after-recording (post-recording) in which original data including a video bit stream are read out from a digital recording medium. The read-out original data are decoded. Audio data are encoded into a new audio bit stream in synchronism with the decoding of the original data. The new audio bit stream is written into an area of the digital recording medium which approximately corresponds in time position to the original-data recording area.

Japanese patent application publication number 11-259992/1999 discloses an optical disc on which the post-recording (the after-recording) of new data can be implemented. The optical disc in Japanese application 11-259992 stores a stream of packs including normal packs and reserved packs. The normal packs are loaded with original moving-picture data. Initially, the reserved packs are unoccupied. New data such as audio data can be written into the reserved packs. The original moving-picture data and the new data can be simultaneously reproduced from the optical disc.

Japanese patent application publication number P2000-197005A discloses an information recording medium having an area "A" and an area "B". The area "A" stores a stream of packs including video packs and audio packs. The area "B" stores a table having first, second, and third information pieces. By referring to the first information piece in the table, a decision is made as to whether or not audio data in the audio packs in the area "A" correspond to silence. In the case where the audio data in the audio packs correspond to silence, post-recording (after-recording) can be implemented as follows. By referring to the second and third information pieces in the table, a new audio signal is encoded into new audio data, and the new audio data are formatted into new audio packs. The new audio packs are written over the old audio packs in the area "A".

Recently, multiplexed data containing video data and audio data have sometimes been handled as a form of a transport stream or a program stream. Generally, it is difficult to replace only audio data in such multiplexed data with new data.

Prior-art post-recording (prior-art after-recording) writes new audio data so that an original multiplexed main stream is converted into a new one. Generally, it is difficult to convert the new multiplexed main stream back into the original one.

In the prior art, it is difficult to post-record a plurality of new audio signals, and to select one from the new audio signals during playback.

SUMMARY OF THE INVENTION

It is a first object of this invention to provide an after-recording apparatus (a post-recording apparatus or a dubbing-in apparatus) which enables a post-recording-resultant signal to be converted back into an original signal.

It is a second object of this invention to provide an after-recording apparatus (a post-recording apparatus or a dubbing-in apparatus) which can post-record a plurality of new audio signals, and which enables one to be selected from the new audio signals during playback.

It is a third object of this invention to provide an improved computer program.

It is a fourth object of this invention to provide an improved recording medium.

It is a fifth object of this invention to provide an improved transmission method.

It is a sixth object of this invention to provide an improved reproducing apparatus.

A first aspect of this invention provides an after-recording apparatus comprising first means for compressively encoding an audio signal into encoding-resultant audio data; second means for compressively encoding a video signal into encoding-resultant video data; third means for adding an audio time stamp for audio-vide synchronous reproduction to every unit of the encoding-resultant audio data generated by the first means; fourth means for adding a video time stamp for audio-video synchronous reproduction to every unit of the encoding-resultant video data generated by the second means; fifth means for multiplexing the time-stamp-added audio data generated by the third means and the time-stamp-added video data generated by the fourth means into main data; sixth means for, to a plurality of first after-recording-purpose encoding-resultant data for at least one of (1) the encoding-resultant audio data generated by the first means and (2) the encoding-resultant video data generated by the second means which form the main data, adding time stamps for reproduction synchronous with a portion of the main data and identification information for identifying the plurality of first after-recording-purpose encoding-resultant data to convert the first after-recording-purpose encoding-resultant data into second after-recording-purpose encoding-resultant data; and seventh means for making the second after-recording-purpose encoding-resultant data generated by the sixth means into bit streams without multiplexing the second after-recording-purpose encoding-resultant data with the main data.

A second aspect of this invention provides a computer program for after recording. The computer program comprises the steps of compressively encoding an audio signal into encoding-resultant audio data; compressively encoding a video signal into encoding-resultant video data; adding an audio time stamp for audio-vide synchronous reproduction to every unit of the encoding-resultant audio data; adding a video time stamp for audio-video synchronous reproduction to every unit of the encoding-resultant video data; multiplexing the time-stamp-added audio data and the time-stamp-added video data into main data; to a plurality of first after-recording-purpose encoding-resultant data for at least one of (1) the encoding-resultant audio data and (2) the encoding-resultant video data which form the main data, adding time stamps for reproduction synchronous with a portion of the main data and identification information for identifying the plurality of first after-recording-purpose encoding-resultant data to convert the first after-recording-purpose encoding-resultant data into second after-recording-purpose encoding-resultant data; and making the second after-recording-purpose encoding-resultant data into bit streams without multiplexing the second after-recording-purpose encoding-resultant data with the main data.

A third aspect of this invention provides a recording medium on which after-recording-purpose data are recorded in a process comprising the steps of compressively encoding an audio signal into encoding-resultant audio data; compressively encoding a video signal into encoding-resultant video data; adding an audio time stamp for audio-vide synchronous reproduction to every unit of the encoding-resultant audio data; adding a video time stamp for audio-video synchronous reproduction to every unit of the encoding-resultant video data; multiplexing the time-stamp-added audio data and the time-stamp-added video data into main data; to a plurality of first after-recording-purpose encoding-resultant data for at least one of (1) the encoding-resultant audio data and (2) the encoding-resultant video data which form the main data, adding time stamps for reproduction synchronous with a portion of the main data and identification information for identifying the plurality of first after-recording-purpose encoding-resultant data to convert the first after-recording-purpose encoding-resultant data into second after-recording-purpose encoding-resultant data; making the second after-recording-purpose encoding-resultant data into bit streams without multiplexing the second after-recording-purpose encoding-resultant data with the main data; and recording the bit streams on the recording medium.

A fourth aspect of this invention provides a method of transmission. The method comprises the steps of compressively encoding an audio signal into encoding-resultant audio data; compressively encoding a video signal into encoding-resultant video data; adding an audio time stamp for audio-vide synchronous reproduction to every unit of the encoding-resultant audio data; adding a video time stamp for audio-video synchronous reproduction to every unit of the encoding-resultant video data; multiplexing the time-stamp-added audio data and the time-stamp-added video data into main data; to a plurality of first after-recording-purpose encoding-resultant data for at least one of (1) the encoding-resultant audio data and (2) the encoding-resultant video data which form the main data, adding time stamps for reproduction synchronous with a portion of the main data and identification information for identifying the plurality of first after-recording-purpose encoding-resultant data to convert the first after-recording-purpose encoding-resultant data into second after-recording-purpose encoding-resultant data; making the second after-recording-purpose encoding-resultant data into bit streams without multiplexing the second after-recording-purpose encoding-resultant data with the main data; and transmitting the bit streams via a transmission line.

A fifth aspect of this invention provides a reproducing apparatus for reproducing after-recording-purpose data and a portion of main data which are generated in a process comprising the steps of compressively encoding an audio signal into encoding-resultant audio data; compressively encoding a video signal into encoding-resultant video data; adding an audio time stamp for audio-vide synchronous reproduction to every unit of the encoding-resultant audio data; adding a video time stamp for audio-video synchronous reproduction to every unit of the encoding-resultant video data; multiplexing the time-stamp-added audio data and the time-stamp-added video data into main data; recording the main data on a recording medium; to a plurality of first after-recording-purpose encoding-resultant data for at least one of (1) the encoding-resultant audio data and (2) the encoding-resultant video data which form the main data, adding time stamps for reproduction synchronous with the portion of the main data and identification information for identifying the plurality of first after-recording-purpose encoding-resultant data to convert the first after-recording-purpose encoding-resultant data into second after-recording-purpose encoding-resultant data; and recording the second after-recording-purpose encoding-resultant data on the recording medium without multiplexing the second after-recording-purpose encoding-resultant data with the main data. The reproducing apparatus comprises first means for selecting one from a plurality of the second after-recording-purpose encoding-resultant data in response to user's request; second means for reading out the second after-recording-purpose encoding-resultant data selected by the first means from the recording medium in response to the identification information corresponding thereto; third means for reading out the main data from the recording medium; fourth means for replacing a portion of the main data with the second after-recording-purpose encoding-resultant data read out by the second means; and fifth means for synchronously reproducing the read-out second after-recording-purpose encoding-resultant data and the main data except the portion in response to time stamps therein.

A sixth aspect of this invention provides a computer program for reproducing after-recording-purpose data and a portion of main data which are generated in a process comprising the steps of compressively encoding an audio signal into encoding-resultant audio data; compressively encoding a video signal into encoding-resultant video data; adding an audio time stamp for audio-vide synchronous reproduction to every unit of the encoding-resultant audio data; adding a video time stamp for audio-video synchronous reproduction to every unit of the encoding-resultant video data; multiplexing the time-stamp-added audio data and the time-stamp-added video data into main data; recording the main data on a recording medium; to a plurality of first after-recording-purpose encoding-resultant data for at least one of (1) the encoding-resultant audio data and (2) the encoding-resultant video data which form the main data, adding time stamps for reproduction synchronous with the portion of the main data and identification information for identifying the plurality of first after-recording-purpose encoding-resultant data to convert the first after-recording-purpose encoding-resultant data into second after-recording-purpose encoding-resultant data; and recording the second after-recording-purpose encoding-resultant data on the recording medium without multiplexing the second after-recording-purpose encoding-resultant data with the main data. The computer program comprises the steps of selecting one from a plurality of the second after-recording-purpose encoding-resultant data in response to user's request; reading out the selected second after-recording-purpose encoding-resultant data from the recording medium in response to the identification information corresponding thereto; reading out the main data from the recording medium; replacing a portion of the main data with the read-out second after-recording-purpose encoding-resultant data; and synchronously reproducing the read-out second after-recording-purpose encoding-resultant data and the main data except the portion in response to time stamps therein.

A seventh aspect of this invention provides an after-recording apparatus comprising first means for encoding a first audio signal into first encoding-resultant audio data; second means for encoding a video signal into encoding-resultant video data; third means for adding a first audio time stamp for audio-vide synchronous playback to the first encoding-resultant audio data generated by the first means; fourth means for adding a video time stamp for audio-video synchronous playback to the encoding-resultant video data generated by the second means; fifth means for multiplexing the time-stamp-added audio data generated by the third means and the time-stamp-added video data generated by the fourth means into main data; sixth means for recording the main data generated by the fifth means on a recording medium; seventh means for encoding a second audio signal into second encoding-resultant audio data; eighth means for encoding a third audio signal into third encoding-resultant audio data; ninth means for adding a second audio time stamp for audio-vide synchronous playback and first identification information to the second encoding-resultant audio data generated by the seventh means, the second audio time stamp being equivalent to the first audio time stamp regarding audio-vide synchronous playback; tenth means for adding a third audio time stamp for audio-vide synchronous reproduction and second identification information to the third encoding-resultant audio data generated by the eighth means, the third audio time stamp being equivalent to the first audio time stamp regarding audio-vide synchronous playback, the second identification information being different from the first identification information; and eleventh means for recording the time-stamp-added and identification-information-added audio data generated by the ninth means and the time-stamp-added and identification-information-added audio data generated by the tenth means on the recording medium.

An eighth aspect of this invention provides a reproducing apparatus for use with a recording medium storing main data and a plurality of after-recording-purpose audio data, the main data including main video data and main audio data, the main video data containing a video time stamp, the main audio data containing a first audio time stamp, the video time stamp and the first audio time stamp being for synchronous playback of video and audio, the plurality of after-recording-purpose audio data having different identification information pieces respectively, the plurality of after-recording-purpose audio data containing second audio time stamps respectively, the second audio time stamps being equivalent to the first audio time stamp regarding synchronous playback of video and audio. The reproducing apparatus comprises first means for designating desired one among the plurality of after-recording-purpose audio data in response to user's request; second means for deciding an identification information piece corresponding to the desired after-recording-purpose audio data designated by the first means; third means for reading out the desired after-recording-purpose audio data from the recording medium in response to the identification information piece decided by the second means; fourth means for reading out the main data from the recording medium; fifth means for separating the main data read out by the fourth means into the main video data and the main audio data; sixth means for detecting the video time stamp in the main video data generated by the fifth means; seventh means for detecting a second audio time stamp in the desired after-recording-purpose audio data read out by the third means; and eighth means for synchronously playing back the desired after-recording-purpose audio data read out by the third means and the main video data generated by the fifth means in response to the video time stamp detected by the sixth means and the second audio time stamp detected by the seventh means.

BRIEF DESCRIPTION OF THE DRAWINGS

FIG. 10 is a diagram of the syntax structure of a second-level segment "GENERAL_IFO" in FIG. 9.
FIG. 12 is a diagram of the syntax structure of a fourth-level segment "PROG_IFO" in FIG. 11.
FIG. 13 is a diagram of the syntax structure of play list information "PLAYL_IFO" in FIG. 9.
FIG. 14 is a diagram of the syntax structure of index information "INDEX_IFO" in FIG. 11.

DETAILED DESCRIPTION OF THE INVENTION

First Embodiment

Figure 1:
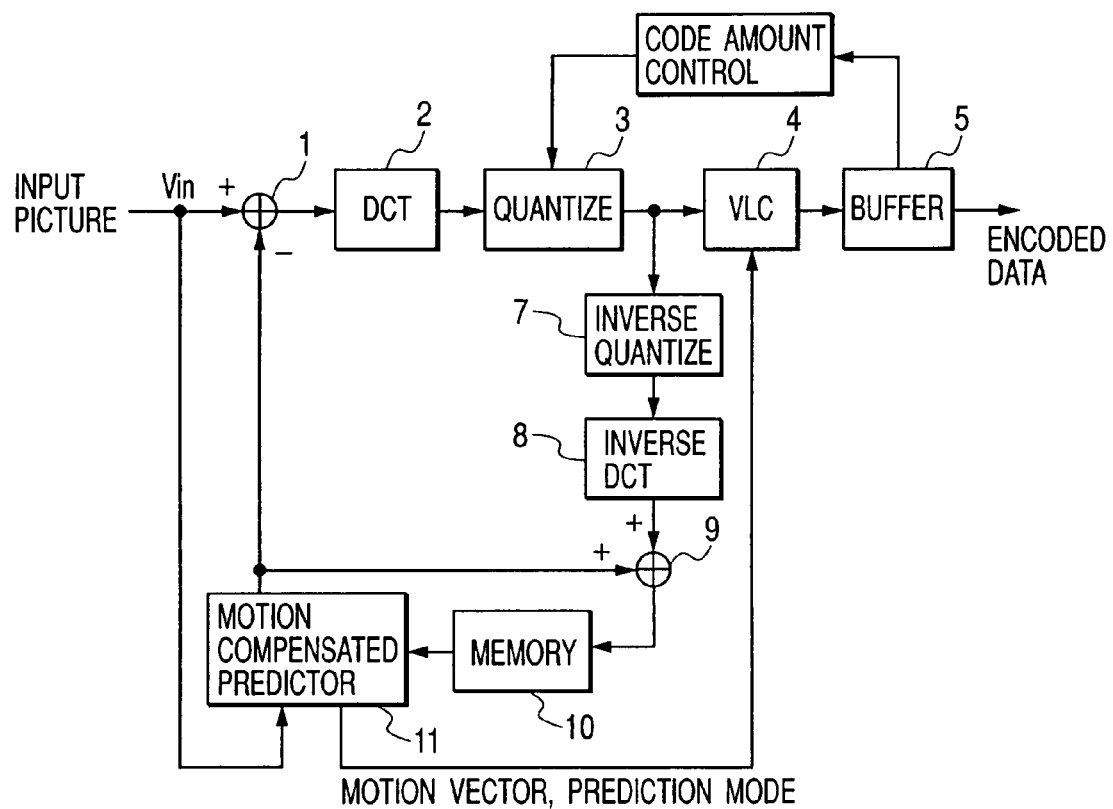
FIG. 1 is a block diagram of an MPEG encoder.

FIG. 1 shows an MPEG (Moving Picture Experts Group) encoder which includes an adder 1 operated as a subtracter. The subtracter 1 calculates an inter-frame prediction error, that is, a residual (an error) between a picture represented by an input video signal Vin and a final reference picture (a final predicted picture) represented by output data from a motion-compensated predictor 11. The subtracter 1 outputs data indicating the calculated residual (the calculated inter-frame prediction error).

Prediction implemented by the motion-compensated predictor 11 is designed as follows. Prediction directions are of three modes, that is, a direction from the past ("forward"), a direction from the future ("backward"), and a direction from both the past and future ("interpolative"). Accordingly, there are prediction from the past ("forward"), prediction from the future ("backward"), and prediction from both the past and future ("interpolative"). An actually-used prediction direction can be changed MB by MB, where MB denotes a macroblock having 16 by 16 pixels. Every picture is divided into a prescribed number of MBs. The actually-used prediction direction is basically decided by the type of every picture represented by the input video signal Vin. Pictures are classified into P pictures (predictive coded pictures), B pictures (bidirectionally predictive coded pictures), and I pictures (intra-coded pictures). MBs representative of a P picture are of first and second modes. P-picture MBs of the first mode are encoded according to prediction from the past. P-picture MBs of the second mode are independently encoded without prediction. MBs representative of a B picture are of first, second, third, and fourth modes. B-picture MBs of the first mode are encoded according to prediction from the future. B-picture MBs of the second mode are encoded according to prediction from the past. B-picture MBs of the third mode are encoded according to prediction from both the past and future. B-picture MBs of the fourth mode are independently encoded without prediction. MBs representative of an I picture are independently encoded without prediction.

Motion compensation implemented by the motion-compensated predictor 11 is designed as follows. According to motion compensation, pattern matching between two pictures is performed for each MB to detect a motion vector or motion vectors at an accuracy corresponding to a half pel (a half pixel). One of the two pictures is given by the input video signal Vin, and the other is referred to as a basic reference picture or a source picture for motion-compensated prediction. The basic reference picture is shifted in accordance with detected motion vectors. A final reference picture (a final predicted picture) is generated on the basis of the shift of the basic reference picture. In the absence of motion compensation, the basic reference picture is directly used as a final reference picture. Generally, a motion vector has a horizontal-direction component and a vertical-direction component. Information representing a detected motion vector or detected motion vectors, and MC-mode (motion-compensation mode) information representing a prediction direction or indicating a source picture from which prediction is implemented are transmitted as added information relating to each MB. A GOP (group of pictures) is defined as a sequence of pictures starting from an I picture and ending at a picture immediately preceding a next I picture. Generally, one GOP has about 15 successive pictures.

The residual-indicating data outputted from the subtracter 1 are subjected to discrete cosine transform (DCT) by a DCT device 2.

Specifically, the DCT device 2 divides every MB represented by the residual-indicating data into 4 DCT blocks each having 8 by 8 pixels. The DCT device 2 subjects each DCT block to two-dimensional DCT to generate data representing DCT coefficients. The DCT device 2 outputs the generated DCT-coefficient data. In general, since a video signal is rich in low-frequency components, there occur a lot of effective DCT coefficients corresponding to low frequencies.

DCT coefficients represented by the output data from the DCT device 2 are quantized by a quantizer 3 in response to a quantization value. The quantization value is equal to a quantization matrix multiplied by a scalar quantization scale. The quantization matrix has 8 by 8 elements resulting from a process of weighting two-dimensional frequency components according to visual sensation. The quantization includes a step of dividing DCT coefficients by the quantization value.

Quantization-resultant data outputted from the quantizer 3 are encoded by a VLC device 4 into data of a variable length code (VLC). Specifically, a direct-current (DC) component of the quantization-resultant data is encoded by DPCM (differential pulse code modulation). Alternating-current (AC) components of the quantization-resultant data are scanned in zigzag along a direction from a high frequency toward a low frequency, and are subjected to Huffman coding in which data pieces having higher occurrence possibilities are assigned to shorter code words. The VLC device 4 receives the motion-vector information and the MC-mode information from the motion-compensated predictor 11. The VLC device 4 adds the motion-vector information and the MC-mode information to the VLC data. The resultant VLC data are temporarily stored in a buffer 5. The VLC data are outputted from the buffer 5 at a prescribed transfer rate as encoding-resultant MPEG data in the form of a bit stream.

The buffer 5 informs a code amount controller 6 of the actual amount of encoding-resultant data for every MB, that is, the total number of bits composing encoding-resultant data for every MB. The code amount controller 6 calculates an error between the actual amount of encoding-resultant data and a target amount thereof. The code amount controller 6 adjusts the quantization scale used by the quantizer 3 in response to the calculated data amount error, and thereby controls the actual amount of encoding-resultant data.

The quantization-resultant data outputted from the quantizer 3 are subjected to inverse quantization by an inverse quantizer 7, being converted back to DCT-coefficient data. The inverse quantizer 7 outputs the DCT-coefficient data. The DCT-coefficient data outputted from the inverse quantizer 7 are subjected to inverse DCT by an inverse DCT device 8, being converted back into residual-indicating data. The inverse DCT device 8 outputs the residual-indicating data. A residual picture represented by the output data from the inverse DCT device 8 and a final reference picture (a final predicted picture) represented by the output data from the motion-compensated predictor 11 are added by an adder 9. The adder 9 outputs addition-resultant video data. The addition-resultant video data are temporarily stored in a memory 10. Video data are fed from the memory 10 to the motion-compensated predictor 11. The output video data from the memory 10 are used by the motion-compensated predictor 11 as an indication of a basic reference picture or a source picture for motion-compensated prediction.

Figure 2:
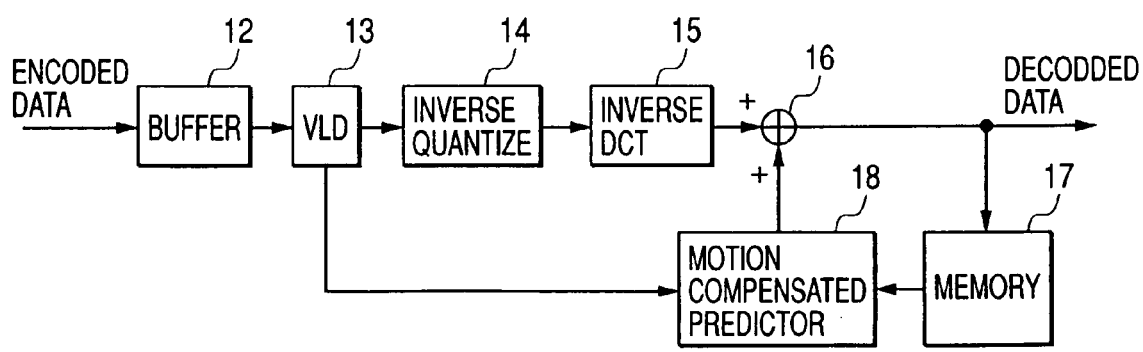
FIG. 2 is a block diagram of an MPEG decoder.

FIG. 2 shows an MPEG decoder which includes a buffer 12. Encoding-resultant MPEG data in the form of a bit stream are temporarily stored in the buffer 12 before being outputted to a VLD (variable length decoding) device 13 therefrom. The VLD device 13 subjects the output data from the buffer 12 to VLD inverse with respect to VLC, thereby recovering DC-component data and AC-component data. The AC-component data are scanned in zigzag along a direction from a high frequency toward a low frequency. The DC-component data and the resultant AC-component data are arranged in a matrix having 8 by 8 elements. The VLD device 13 outputs the matrix-arranged data to an inverse quantizer 14. The VLD device 13 extracts motion-vector information and MC-mode information from the data outputted by the buffer 12. The VLD device 13 outputs the motion-vector information and the MC-mode information to a motion-compensated predictor 18.

The inverse quantizer 14 subjects the output data from the VLD device 13 to inverse quantization responsive to the quantization value, thereby recovering DCT-coefficient data. The inverse quantization includes a step of multiplying processed data values by the quantization value. It should be noted that the quantization value is equal to the quantization matrix multiplied by the scalar quantization scale. The DCT-coefficient data are outputted from the inverse quantizer 14 to an inverse DCT device 15, being subjected to inverse DCT and hence being converted back into residual-indicating data. The inverse DCT device 15 outputs the residual-indicating data. A residual picture represented by the output data from the inverse DCT device 15 and a final reference picture (a final predicted picture) represented by output data from the motion-compensated predictor 18 are added by an adder 16. The adder 16 outputs addition-resultant video data as decoding-resultant video data (original video data). The decoding-resultant video data are transmitted toward an external. The addition-resultant video data outputted from the adder 16 are temporarily stored in a memory 17. Video data are fed from the memory 17 to the motion-compensated predictor 18. The output video data from the memory 17 are used by the motion-compensated predictor 18 as an indication of a basic reference picture or a source picture for motion-compensated prediction. The motion-compensated predictor 18 generates a final reference picture (a final predicted picture) in response to the basic reference picture, the motion-vector information, and the MC-mode information. The motion-compensated predictor 18 outputs data representing the final reference picture.

An MPEG system will be explained below. The MPEG system prescribes the following five items.
1) Synchronous reproduction of a plurality of encoding-resultant bit streams;
2) Multiplexing a plurality of encoding-resultant bit streams into a single bit stream;
3) Initialization of a buffer at start of reproduction;
4) Continuous management of a buffer; and
5) Identification of time of decoding or reproduction.

The multiplexing of information in the MPEG system includes a step of packeting the information. For example, in the case where video information and audio information are required to be multiplexed, each of the video information and the audio information is divided into packets having a suitable length. Additional information such as header information is added to each packet. Video-information packets and audio-information packets are mixed into a packet sequence before the packet sequence is transmitted. Therefore, the video-information packets and the audio-information packets are transmitted on a time sharing basis. The header information contains information for identifying whether a related packet is of video or audio, and timing information for synchronization. In general, the packet length depends on a transmission medium and an application. For example, the packet length is equal to 53 bytes in the case of ATM (asynchronous transfer mode). The packet length is equal to 4 kilobytes in the case of an optical disc. According to the MPEG system, the packet length is variable, and can be set to an arbitrary value.

Data to be transmitted are divided into packs, and are packeted. One pack is composed of several packets. A header portion of each pack is loaded with a pack-start-code and an SCR (system clock reference). A header of each packet is loaded with a stream ID and a time stamp. The time stamp contains timing information for synchronization between audio and video. The time stamp is of two types referred to as a DTS (decoding time stamp) and a PTS (presentation time stamp) respectively. The transmitted data contain a periodically-occurring PCR (program clock reference) indicating a frequency of 27 MHz. A reference clock common to decoders can be locked to the frequency indicated by the PCR. The DTS denotes the desired decoding start time for a first access unit in a related packet, while the PTS denotes the desired indication start time (the desired playback start time) therefor. One access unit corresponds to one picture in the case of video. One access unit corresponds to 1152 samples in the case of audio. The DTS and the PTS are given at a time accuracy based on the frequency indicated by the PCR.

Figure 3:
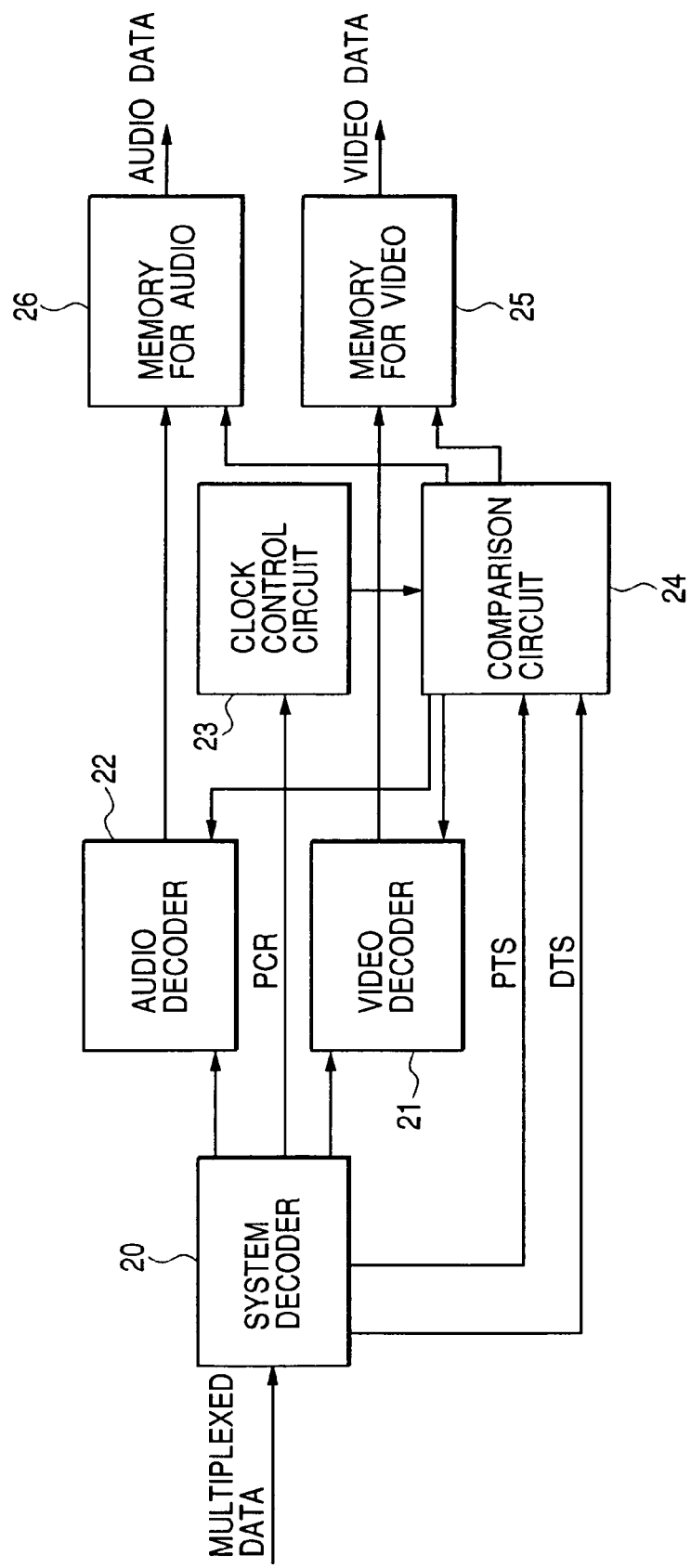
FIG. 3 is a block diagram of an MPEG-system decoding apparatus.

FIG. 3 shows an MPEG-system decoding apparatus which includes a system decoder 20 receiving multiplexed data (a system bit stream) containing video information and audio information. The system decoder 20 demultiplexes the received data into video data and audio data. The system decoder 20 outputs the video data to a video decoder (an MPEG video decoder) 21. The system decoder 20 outputs the audio data to an audio decoder (an MPEG audio decoder) 22. In addition, the system decoder 20 extracts every PCR, every video DTS, every audio DTS, every video PTS, and every audio PTS from the received data. The system decoder 20 may extract every SCR from the received data. The system decoder 20 outputs the PCR (or the SCR) to a clock control circuit 23. The system decoder 20 outputs the video DTS, the audio DTS, the video PTS, and the audio PTS to a comparison circuit 24.

The clock control circuit 23 includes an oscillator for generating a reference clock signal denoting reference clock time. The clock control circuit 23 locks the frequency of oscillation of the oscillator to a frequency indicated by the PCR. Therefore, the reference clock time is decided on the basis of the PCR. The clock control circuit 23 informs the comparison circuit 24 of reference clock time, that is, time denoted by the reference clock signal.

The comparison circuit 24 compares time denoted by the video DTS with the reference clock time to decide whether or not the video DTS time agrees with the reference clock time. When the video DTS time agrees with the reference clock time, the comparison circuit 24 enables the video decoder 21 to start the decoding of the video data. The video decoder 21 stores the decoding-resultant video data into a memory 25. The comparison circuit 24 compares time denoted by the audio DTS with the reference clock time to decide whether or not the audio DTS time agrees with the reference clock time. When the audio DTS time agrees with the reference clock time, the comparison circuit 24 enables the audio decoder 22 to start the decoding of the audio data. The audio decoder 21 stores the decoding-resultant audio data into a memory 26.

The comparison circuit 24 compares time denoted by the video PTS with the reference clock time to decide whether or not the video PTS time agrees with the reference clock time. When the video PTS time agrees with the reference clock time, the comparison circuit 24 enables the memory 25 to output the decoding-resultant video data for an indication purpose. The comparison circuit 24 compares time denoted by the audio PTS with the reference clock time to decide whether or not the audio PTS time agrees with the reference clock time. When the audio PTS time agrees with the reference clock time, the comparison circuit 24 enables the memory 26 to output the decoding-resultant audio data for a playback purpose. The video PTS and the audio PTS are preset so that the decoding-resultant video data and the decoding-resultant audio data can be synchronously outputted from the memories 25 and 26. Therefore, video information and audio information can be synchronously played back.

It is considered that a portion of the MPEG-system decoding apparatus of FIG. 3 corresponds to a virtual decoder for temporarily storing decoding-resultant data of plural types, and implementing synchronous reproduction of the plural-type data. The virtual decoder is referred to as an STD (system target decoder). A multiplexing-resultant bit stream is designed so that memories in the STD will neither overflow nor underflow.

According to the MPEG system, there are a transport stream (TS) and a program stream (PS). The TS or the PS is formed by packetized elementary streams (PESs) and packets loaded with other information. The PESs are defined as intermediate streams for conversion or transformation between a TS and a PS. The PESs are generated by packeting, for example, encoding-resultant MPEG video data, encoding-resultant MPEG audio data, or a private stream.

Figure 4:
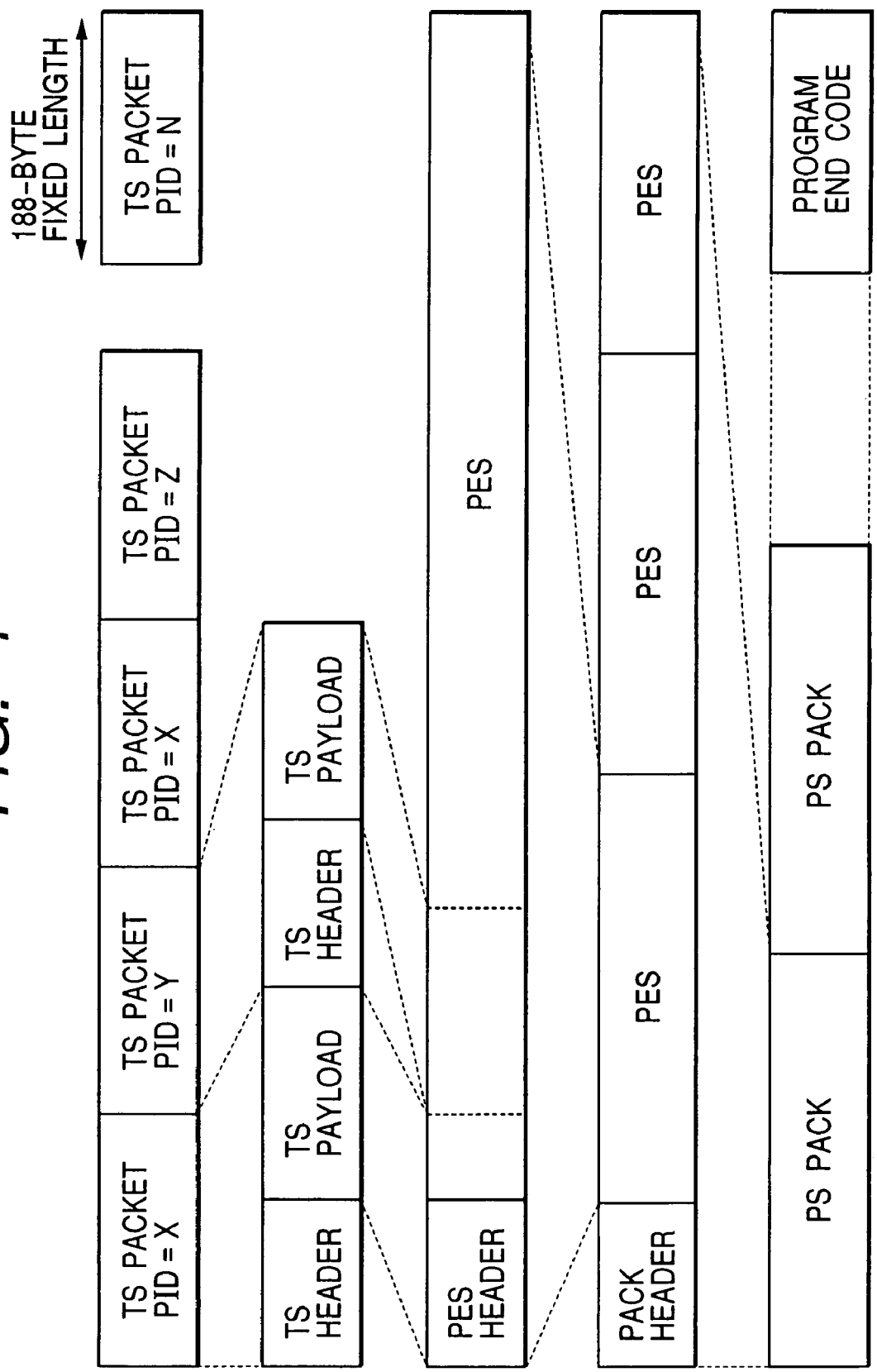
FIG. 4 is a diagram of the relation among an MPEG transport stream (TS), an MPEG program stream (PS), and packetized elementary streams (PESs).

Video and audio data of content programs having common reference time can be multiplexed into a PS. The PS includes a sequence of packets. A packet layer of the PS is called "PES". With reference to FIG. 4, the packet layer of the PS is common to that of a TS so that compatibility between the PS and the TS is provided. According to an STD model for a PS, the decoding mode for a bit stream to be decoded is switched to a PS side by a stream ID in a PES packet.

Video and audio data of content programs having common reference time can also be multiplexed into a TS. Furthermore, video and audio data of content programs different in reference time can be multiplexed into a TS. The TS is formed by a sequence of fixed-length packets, that is, 188-byte packets (TS packets). The TS is designed to be usable in a system where a data error or data errors are caused by a transmission line. As understood from the above explanation, the TS is a stream representing multiple content-programs. Although a TS packet ranks higher than a PES packet, the TS packet is normally shorter than the PES packet. Generally, one PES packet is divided into segments, and the PES packet segments are placed in plural TS packets respectively. According to an STD model for a TS, the decoding mode for a bit stream to be decoded is switched to a PS side by a packet ID (PID) in a TS packet.

Figure 5:
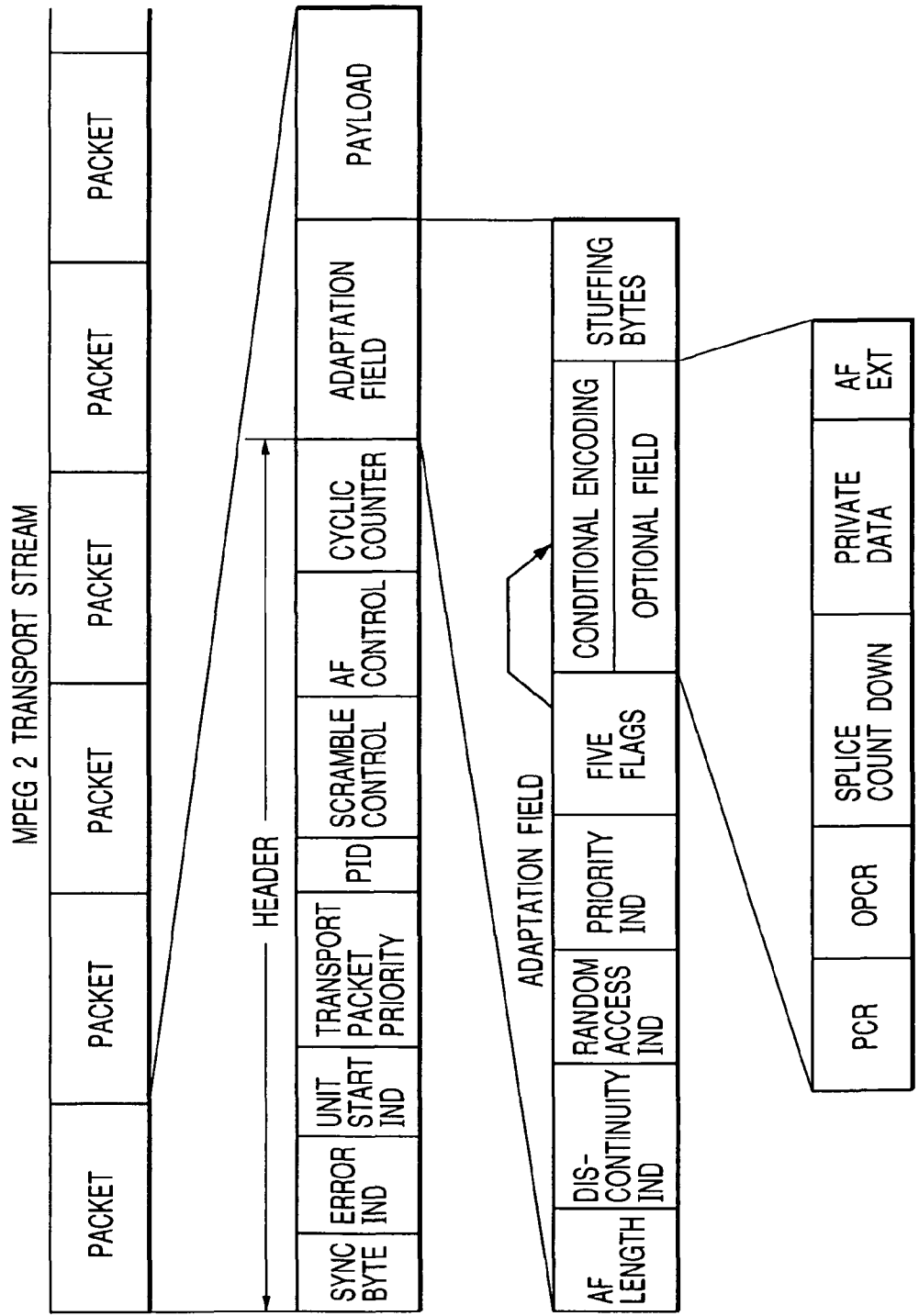
FIG. 5 is a diagram of the format of a TS packet.

With reference to FIG. 5, a TS packet has a header, an adaptation field (AF), and a payload which are sequentially arranged in that order. The header includes a sync byte, an error indicator, a unit start indicator, and a transport packet priority flag which are sequentially arranged in that order. In the header, the transport packet priority flag is followed by a PID which indicates the type of the payload in the related packet (the type of data in the payload in the related packet). In the header, the PID is successively followed by a scramble control information piece, an AF control information piece, and a cyclic counter. The tail of the header is occupied by the cyclic counter. The AF control information piece represents whether the adaptation filed (AF) is present in or absent from the related packet. When the AF control information piece represents the absence of the adaptation field, the header is immediately followed by the payload. On the other hand, when the AF control information piece represents the presence of the adaptation field, the header is successively followed by the adaptation field (AF) and the payload. The cyclic counter indicates the continuity about the related packet. In general, adaptation information is placed in the adaptation field (AF) while content data such as video data or audio data are placed in the payload. Ineffective data (dummy data) can be placed in the payload.

As shown in FIG. 5, the adaptation field includes an optional field. A 48-bit front end of the optional field is loaded with a PCR.

Figure 6:
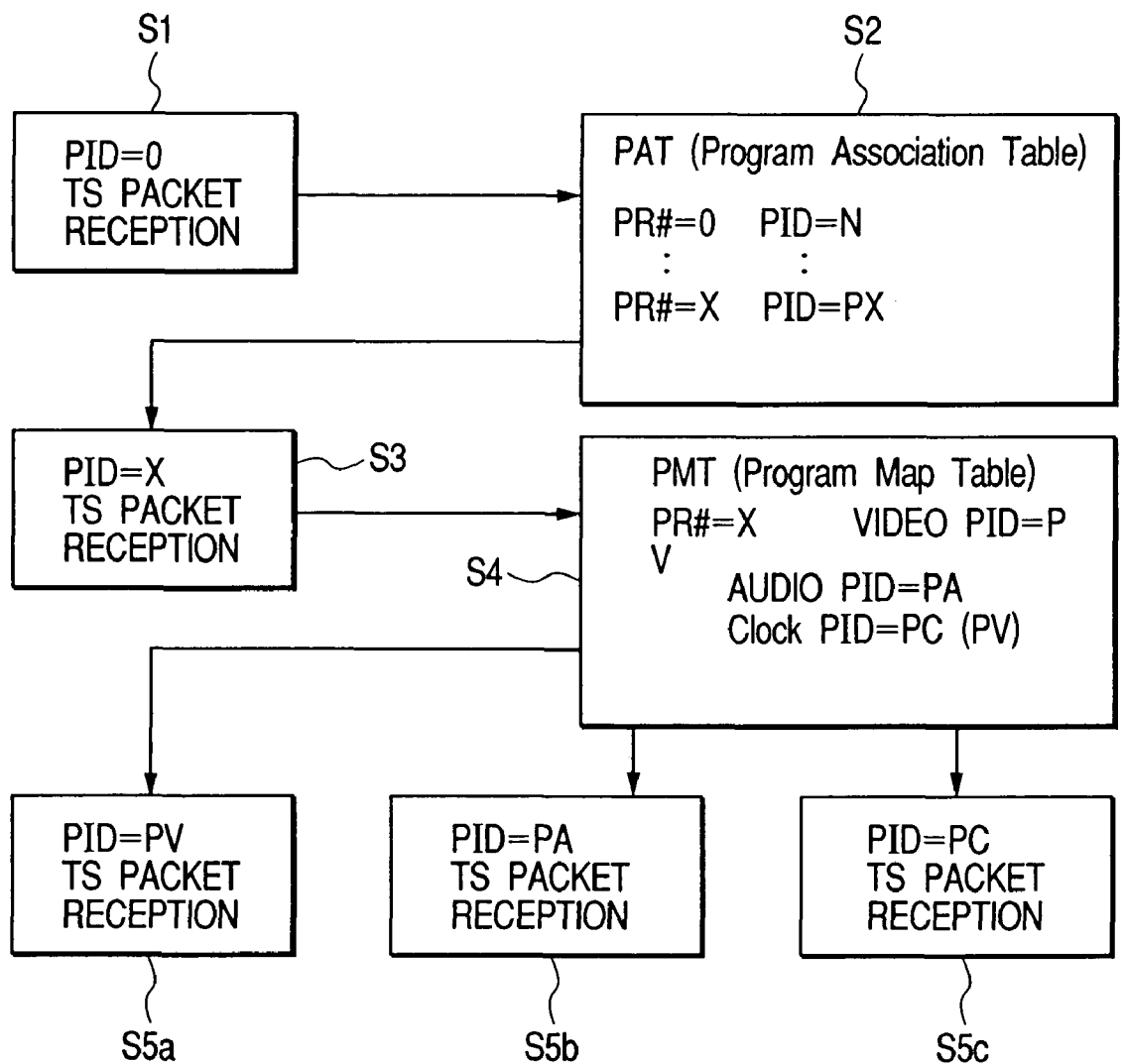
FIG. 6 is a flow diagram of the reception of TS packets in response to packet IDs (PIDs).

The MPEG system handling a TS is designed to provide a mechanism for detecting the PIDs in TS packets and classifying the TS packets according to the detected PIDs during reception and decoding procedures. Specifically, with reference to FIG. 6, TS packets are searched for one having a PID=0 at a stage S1. In other words, a TS packet having a PID=0 is received. The TS packet having a PID=0 is referred to as a PAT (program association table) packet. The PAT packet is loaded with PAT information representing the relation between program numbers (content-program ID numbers) PR and special PIDs on a link basis, that is, the relation between content programs and the special PIDs. At a stage S2 following the stage S1, the PAT information in the PAT packet is detected. Each of the special PIDs corresponds to a PMT (program map table) packet. The PMT packet is loaded with PMT information representing the relation among the related content program, PIDs in video packets representing the related content program, and PIDs in audio packets representing the related content program. One is selected in advance from content programs as a desired content program. At the stage S2, one of the special PIDs which corresponds to the desired content program is detected by referring to the PAT information in the PAT packet. At a stage S3 following the stage S2, a PMT packet having a PID identical with the detected special PID is received or searched for. At a stage S4 subsequent to the stage S3, the received PMT packet is accessed to get PMT information. According to the PMT information in the accessed PMT packet, PIDs in video packets and audio packets representing the desired content program are detected. In addition, PIDs in sync clock packets relating to the desired content program are detected. At a stage S5a following the stage S4, TS packets corresponding to the detected video packet PIDs are received. Video information is extracted from the received TS packets. At a stage S5b following the stage S4, TS packets corresponding to the detected audio packet PIDs are received. Audio information is extracted from the received TS packets. At a stage S5c following the stage S4, TS packets corresponding to the detected sync clock packet PIDs are received. Sync clock information is extracted from the received TS packets. In this way, the video packets and the audio packets representing the desired content program are accessed in response to the detected PIDs. Entry into the desired content program is implemented by referring to the PAT and the PMT. The PAT and the PMT are called PSI (program specific information).

Figure 7:
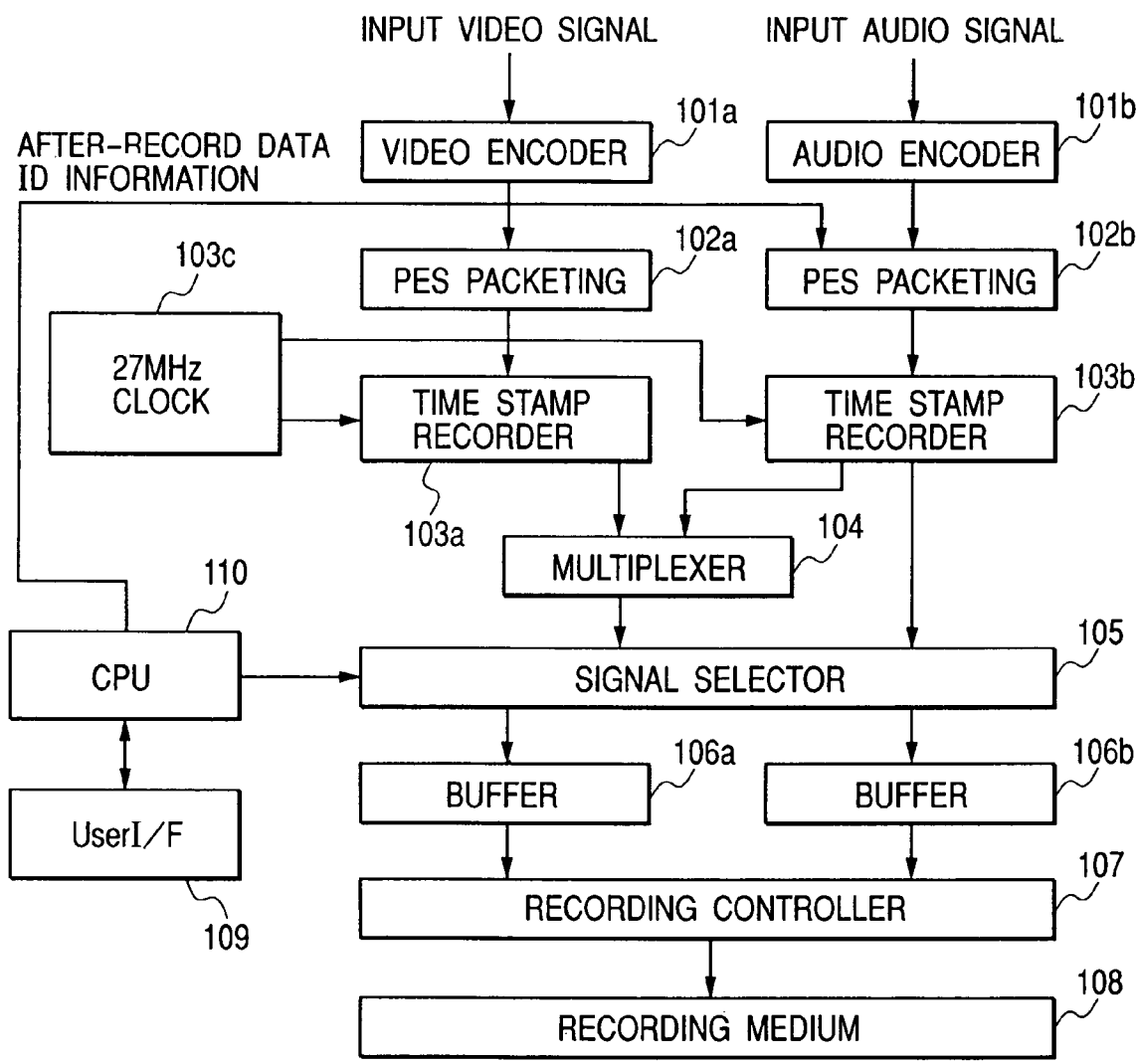
FIG. 7 is a block diagram of an after-recording apparatus in a first embodiment of this invention.

FIG. 7 shows an after-recording apparatus (a post-recording apparatus) using the MPEG encoder of FIG. 1. As shown in FIG. 7, the after-recording apparatus includes a user interface 109 connected with a CPU 110. The user interface 109 can be handled by a user. The CPU 110 has a combination of an input/output port, a processing section, a ROM, and a RAM. The CPU 110 operates in accordance with a control program stored in the ROM or the RAM. The control program is designed to enable the CPU 110 to implement operation steps mentioned later. By handling the user interface 109, operation of the after-recording apparatus can be changed among different modes including a first mode and a second mode. The first operation mode is designed to record main data. The second operation mode is designed to record after-recording-purpose audio data. When the user interface 109 is handled, an operation-mode designation signal is inputted therefrom into the CPU 110. The operation-mode designation signal indicates which of the first operation mode and the second operation mode is desired. The CPU 110 transfers the operation-mode designation signal to a signal selector 105.

When the operation-mode designation signal indicates that the first operation mode is desired, that is, when the recording of main data is desired, the after-recording apparatus operates as follows. Input video data are fed to a video encoder 101a, and input audio data are fed to an audio encoder 101b. In general, the input video data and the input audio data represent a common content program (a common audio-visual program), and are synchronous with each other. The video encoder 101a implements the MPEG encoding of the input video data to generate encoding-resultant video data. The encoding-resultant video data are sent from the video encoder 101a to a PES packeting device 102a. The audio encoder 101b implements the MPEG encoding of the input audio data to generate encoding-resultant audio data. The encoding-resultant audio data are sent from the audio encoder 101b to a PES packeting device 102b. The PES packeting device 102a converts the encoding-resultant video data into a sequence of PES packets. The PES packet sequence is sent from the PES packeting device 102a to a time stamp recorder 103a. The PES packeting device 102b converts the encoding-resultant audio data into a sequence of PES packets. The PES packet sequence is sent from the PES packeting device 102b to a time stamp recorder 103b.

A signal generator 103c outputs a 27-MHz clock signal to the time stamp recorders 103a and 103b. The time stamp recorder 103a generates timing information pieces, that is, a PCR and periodically-updated time stamps (a video PTS and a video DTS), in response to the 27-MHz clock signal. The time stamp recorder 103a records the PCR, the PTS, and the DTS in each PES packet. Timing-information-added PES packets are sequentially sent from the time stamp recorder 103a to a multiplexer 104. The time stamp recorder 103b generates a PCR and periodically-updated time stamps (an audio PTS and an audio DTS) in response to the 27-MHz clock signal. The time stamp recorder 103b records the PCR, the PTS, and the DTS in each PES packet. Timing-information-added PES packets are sequentially sent from the time stamp recorder 103b to the multiplexer 104. The multiplexer 104 multiplexes the PES packets from the time stamp recorder 103a and the PES packets from the time stamp recorder 103b to generate multiplexing-resultant data (main data) of a PS form or a TS form. The multiplexing-resultant data are sent from the multiplexer 104 to the signal selector 105.

The signal selector 105 selects the multiplexing-resultant data (the main data) in response to the operation-mode designation signal, and passes the multiplexing-resultant data to a buffer 106a. The multiplexing-resultant data are stored in the buffer 106a before being outputted therefrom to a recording controller 107. The recording controller 107 records the main data (the multiplexing-resultant data) on a recording medium 108 as a file having a name "PR . . . .dat" (see FIG. 8).

The video PTS and the video DTS recorded by the time stamp recorder 103a, and the audio PTS and the audio DTS recorded by the time stamp recorder 103b are in a relation such that the video information and the audio information can be synchronously reproduced from the recorded main data.

When the operation-mode designation signal indicates that the second operation mode is desired, that is, when the recording of after-recording-purpose audio data is desired, the after-recording apparatus operates as follows. The CPU 110 sends identification information (ID information) of after-recording-purpose audio data to the PES packeting device 102b. After-recording-purpose audio data are fed to the audio encoder 101b. The after-recording purpose audio data have a synchronized relation with the video information in the main data. The audio encoder 101b implements the MPEG encoding of the after-recording-purpose audio data to generate encoding-resultant audio data. The encoding-resultant audio data are sent from the audio encoder 101b to the PES packeting device 102b.

The PES packeting device 102b adds the after-recording ID information to the encoding-resultant audio data, and converts the ID-added encoding-resultant video data into a sequence of PES packets. The PES packet sequence is sent from the PES packeting device 102b to the time stamp recorder 103b. The signal generator 103c outputs the 27-MHz clock signal to the time stamp recorder 103b. The time stamp recorder 103b generates timing-information pieces, that is, a PCR and periodically-updated time stamps (an audio PTS and an audio DTS), in response to the 27-MHz clock signal. The time stamp recorder 103b records the PCR, the PTS, and the DTS in each PES packet. Preferably, the PCR, the PTS, and the DTS are set equal to those which have been added to each audio PES packet during the recording of the main data. In this case, the timing relation of the after-recorded audio data with the video information in the recorded main data will be the same as that of the audio information in the recorded main data with the video information therein. Timing-information-added PES packets are sequentially sent from the time stamp recorder 103b to the signal selector 105 without being propagated through the multiplexer 104. The signal selector 105 selects the data (the PES packet sequence) outputted by the time stamp recorder 103b in response to the operation-mode designation signal, and passes the selected data to a buffer 106b. The selected data are stored in the buffer 106b before being outputted from the buffer 106b to the recording controller 107. The recording controller 107 records the output data from the buffer 106b on a recording medium 108 as after-recorded audio data (post-recorded audio data). The after-recorded audio data on the recording medium 108 are in a file having a name "AF- . . . .dat" (see FIG. 8).

As previously mentioned, the CPU 110 is connected with the user interface 109. The CPU 110 can receive an operation-mode designation signal from the user interface 109. The CPU 110 responds to the operation-mode designation signal. The CPU 110 is connected with the devices 101a, 101b, 102a, 102b, 103a, 103b, 104, 105, 106a, 106b, and 107. The CPU 110 can control the devices 101a, 101b, 102a, 102b, 103a, 103b, 104, 105, 106a, 106b, and 107. As previously mentioned, the CPU 110 has a combination of an input/output port, a processing section, a ROM, and a RAM. The CPU 110 operates in accordance with a control program stored in the ROM or the RAM. Preferably, the control program is transmitted into the CPU 110 from a recording medium. The control program may be downloaded into the CPU 110 via a communication network.

Figure 18:
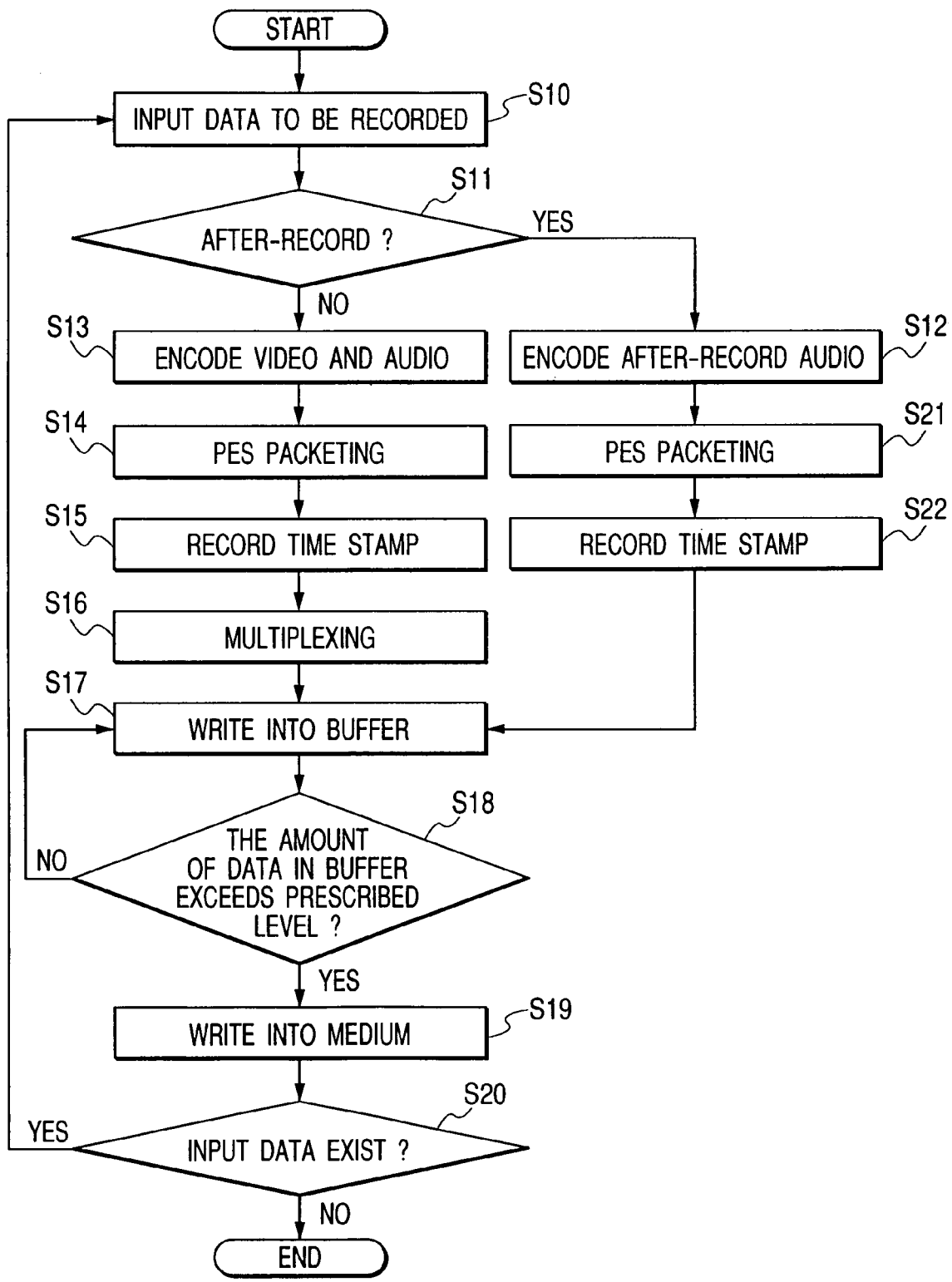
FIG. 18 is a flowchart of a segment of a control program for a CPU in FIG. 7.

FIG. 18 is a flowchart of a segment of the control program for the CPU 110. As shown in FIG. 18, a first step S10 of the program segment implements the reception of input data (input video data and input audio data) to be recorded. The step S10 feeds the input video data to the video encoder 101a. The step S10 feeds the input audio data to the audio encoder 101b.

A step S11 following the step S10 decides whether or not the after-recording operation mode (the second operation mode) is desired by referring to an operation-mode designation signal outputted from the user interface 109. When the after-recording operation mode is desired, the program advances from the step S11 to a step S12. Otherwise, the program advances from the step S11 to a step S13.

The step S13 controls the video encoder 101a to implement the MPEG encoding of the input video data to generate encoding-resultant video data. The encoding-resultant video data are sent from the video encoder 101a to the PES packeting device 102a. The step S13 controls the audio encoder 101b to implement the MPEG encoding of the input audio data to generate encoding-resultant audio data. The encoding-resultant audio data are sent from the audio encoder 101b to the PES packeting device 102b.

A step S14 subsequent to the step S13 controls the PES packeting device 102a to convert the encoding-resultant video data into a sequence of PES packets. The PES packet sequence is sent from the PES packeting device 102a to the time stamp recorder 103a. The step S14 controls the PES packeting device 102b to convert the encoding-resultant audio data into a sequence of PES packets. The PES packet sequence is sent from the PES packeting device 102b to the time stamp recorder 103b.

A step S15 following the step S14 controls the time stamp recorder 103a to generate timing information pieces, that is, a PCR and periodically-updated time stamps (a video PTS and a video DTS), in response to the 27-MHz clock signal. The step S15 controls the time stamp recorder 103a to record the PCR, the PTS, and the DTS in each PES packet. Timing-information-added PES packets are sequentially sent from the time stamp recorder 103a to the multiplexer 104. The step S15 controls the time stamp recorder 103b to generate a PCR and periodically-updated time stamps (an audio PTS and an audio DTS) in response to the 27-MHz clock signal. The step S15 controls the time stamp recorder 103b to record the PCR, the PTS, and the DTS in each PES packet. Timing-information-added PES packets are sequentially sent from the time stamp recorder 103b to the multiplexer 104.

A step S16 subsequent to the step S15 controls the multiplexer 104 to multiplex the PES packets from the time stamp recorder 103a and the PES packets from the time stamp recorder 103b, and thereby to generate multiplexing-resultant data (main data) of a PS form or a TS form. The multiplexing-resultant data are sent from the multiplexer 104 to the signal selector 105.

A step S17 following the step S16 controls the signal selector 105 in response to the operation-mode designation signal so that the signal selector 105 selects the multiplexing-resultant data (the main data) from the multiplexer 104 and passes the multiplexing-resultant data to the buffer 106a. The step S17 controls the buffer 106a to store the multiplexing-resultant data.

A step S18 subsequent to the step S17 monitors the amount (the number of bits) of the multiplexing-resultant data in the buffer 106a. The step S18 decides whether or not the amount of the multiplexing-resultant data in the buffer 106a exceeds a prescribed amount. When the amount of the multiplexing-resultant data in the buffer 106a exceeds the prescribed amount, the program advances from the step S18 to a step S19. Otherwise, the program returns from the step S18 to the step S17.

The step S19 controls the buffer 106a to output the multiplexing-resultant data to the recording controller 107. The step S19 controls the recording controller 107 to record the main data, that is, the multiplexing-resultant data, on a recording medium 108 as a file having a name "PR . . . .dat" (see FIG. 8).

A step S20 following the step S19 decides whether or not remaining input data exist. When remaining input data exist, the program returns from the step S20 to the step S10. Otherwise, the program advances from the step S20, and then the current execution cycle of the program segment ends.

The step S12 controls the audio encoder 101b to implement the MPEG encoding of the input audio data (the after-recording-purpose audio data) to generate encoding-resultant audio data. The encoding-resultant audio data are sent from the audio encoder 101b to the PES packeting device 102b.

A step S21 subsequent to the step S20 sends identification information (ID information) of the after-recording-purpose audio data to the PES packeting device 102b. The step S21 controls the PES packeting device 102b to add the after-recording ID information to the encoding-resultant audio data, and to convert the ID-added encoding-resultant video data into a sequence of PES packets. The PES packet sequence is sent from the PES packeting device 102b to the time stamp recorder 103b.

A step S22 following the step S21 controls the time stamp recorder 103b to generate timing-information pieces, that is, a PCR and periodically-updated time stamps (an audio PTS and an audio DTS), in response to the 27-MHz clock signal. The step S22 controls the time stamp recorder 103b to record the PCR, the PTS, and the DTS in each PES packet. Preferably, the PCR, the PTS, and the DTS are set equal to those which have been added to each audio PES packet during the recording of the main data. In this case, the timing relation of the after-recorded audio data with the video information in the recorded main data will be the same as that of the audio information in the recorded main data with the video information therein. Timing-information-added PES packets are sequentially sent from the time stamp recorder 103b to the signal selector 105 without being propagated through the multiplexer 104.

The step S17 subsequent to the step S16 controls the signal selector 105 in response to the operation-mode designation signal so that the signal selector 105 selects the audio data (the PES packet sequence) outputted by the time stamp recorder 103b and passes the selected audio data to the buffer 106b. The step S17 controls the buffer 106b to store the selected audio data.

The step S18 following the step S17 monitors the amount (the number of bits) of the audio data in the buffer 106b. The step S18 decides whether or not the amount of the audio data in the buffer 106b exceeds a prescribed amount. When the amount of the audio data in the buffer 106b exceeds the prescribed amount, the program advances from the step S18 to the step S19. Otherwise, the program returns from the step S18 to the step S17.

The step S19 controls the buffer 106b to output the audio data to the recording controller 107. The step S19 controls the recording controller 107 to record the audio data from the buffer 106b on a recording medium 108 as after-recorded audio data (post-recorded audio data). The after-recorded audio data on the recording medium 108 are in a file having a name "AF- . . . .dat" (see FIG. 8). The step S19 is followed by the step S20.

According to an information format mentioned later, after-recording-purpose audio data are recorded on a recording medium as play list information. Specifically, first after-recording-purpose audio data are recorded as a file having a name "AF-1.dat" in a PLO folder (see FIG. 8). Also, second and later after-recording-purpose audio data are recorded. Furthermore, m-th after-recording-purpose audio data are recorded as a file having a name "AF-m.dat" in the PLO folder (see FIG. 8). Thus, "m" different types of after-recording-purpose audio data are recorded. An information piece "AF_number" (see FIG. 13) identifies after-recording-purpose audio data. Since the information piece "AF_number" has 8 bits ("0" is unused), up to 254 different types of after-recording-purpose audio data can be recorded.

Figure 8:
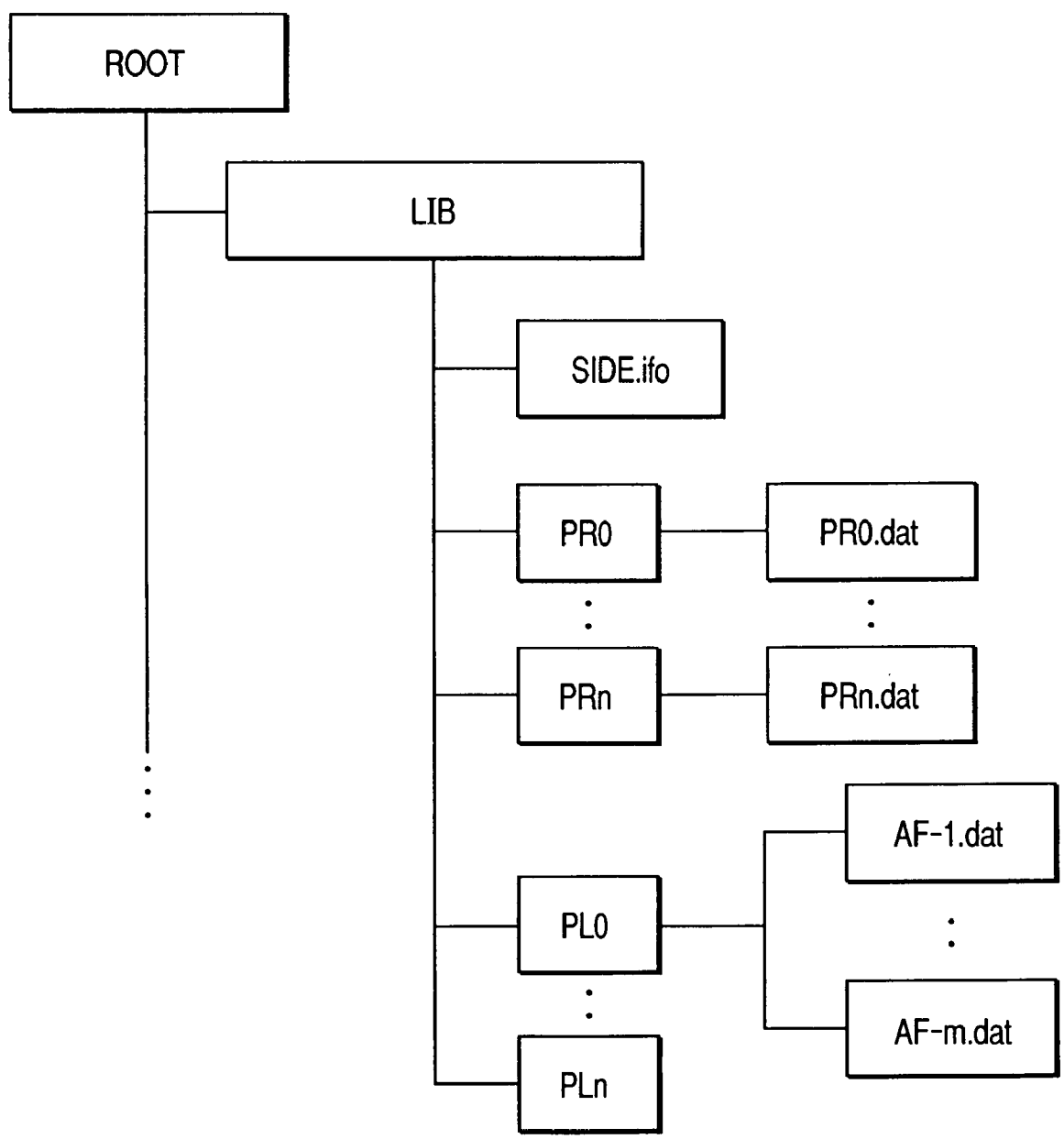
FIG. 8 is a diagram of the file structure of library information recorded on a recording medium.

The format of information recorded on a recording medium 108 will be explained below. As shown in FIG. 8, the recording medium 108 stores a ROOT directory under which a folder named "LIB (library)" is placed. Under the folder "LIB", there are a plurality of files named "SIDE.ifo" ("SIDE0.ifo", "SIDE1.ifo", . . . , and "SIDEk.ifo"). The files "SIDE.ifo" are loaded with side information relating to a plurality of content programs, that is, audio-visual (AV) programs.

In addition, under the folder "LIB", there are folders "PR0", "PR1", . . . , and "PRn" loaded with information pieces "PR0.dat", "PR1.dat", and "PRn.dat", respectively. The information pieces "PR0.dat", "PR1.dat", and "PRn.dat" are designed for link with AV multiplexing-resultant bit streams.

Furthermore, under the folder "LIB", there are folders "PL0", "PL1", . . . , and "PLn" for containing after-recorded audio files (files loaded with after-recorded audio information). For example, in the case where "m" after-recorded audio files relating to the folder "PR0" are made and recorded, list information pieces "AF0-1.dat", "AF0-2.dat", . . . , "AF0-m.dat" are placed in the folder "PL0" as information for link with the after-recorded audio files.

As understood from the above description, link information relating to AV multiplexing-resultant files and after-recorded audio files is recorded on the recording medium 108. Desired content information can be reproduced from the recording medium on the basis of the link information.

Figure 9:
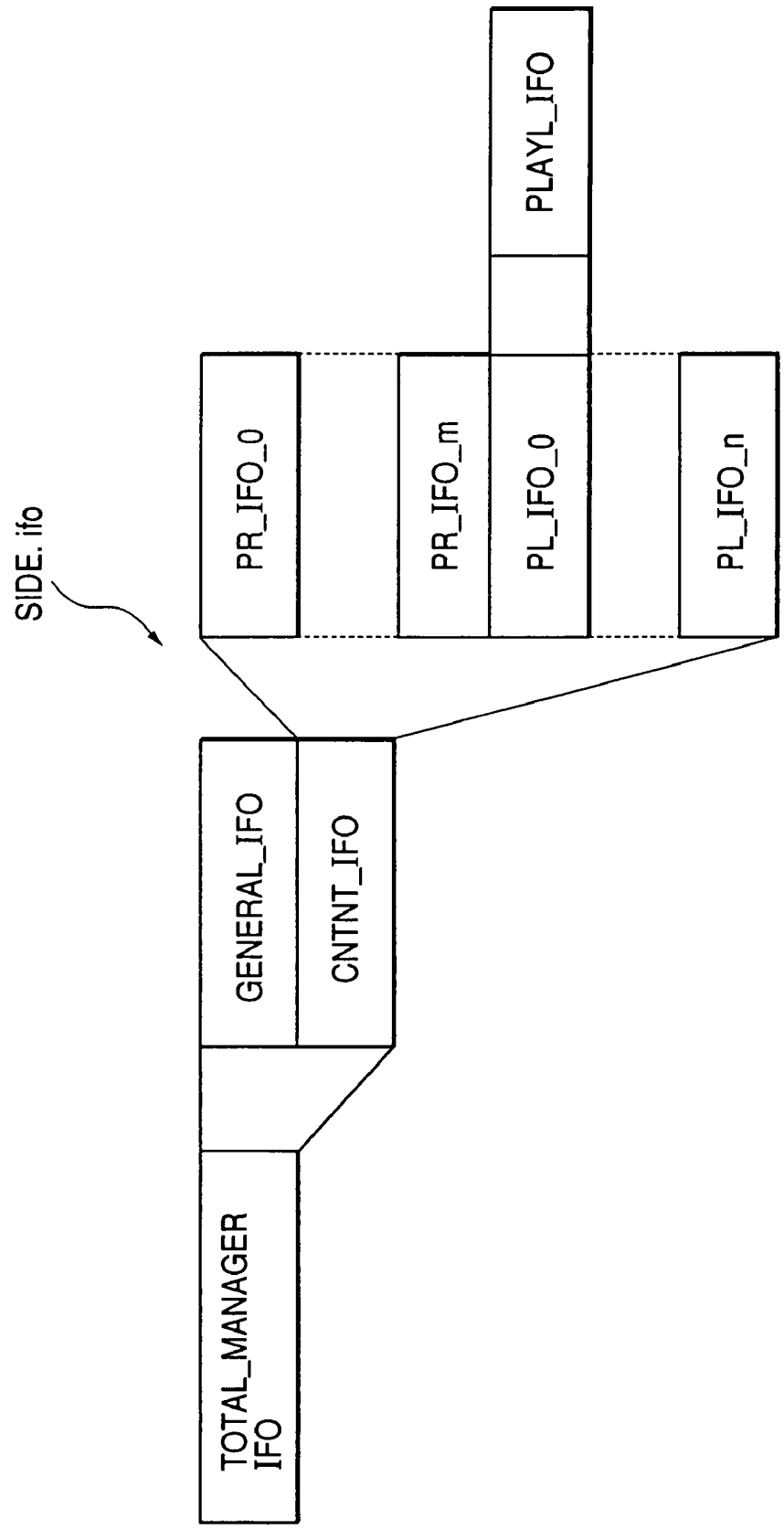
FIG. 9 is a diagram of the structure of a file "SIDE.ifo" in FIG. 8.

With reference to FIG. 9, each file "SIDE.ifo" is in a format having a hierarchical structure. Specifically, each file "SIDE- .ifo" has a first-level segment "TOTAL_MANAGER_IFO" containing second-level segments "GENERAL_IFO" and "CNTNT_IFO". The second-level segment "GENERAL_IFO" is loaded with parameters relating to the whole of the present side information.

The second-level segment "GENERAL_IFO" is of a syntax structure shown in FIG. 10. Specifically, the second-level segment "GENERAL_IFO" includes information pieces having syntax names "System_id", "TMG_IFO_length", "Num of PR_IFO", "Num of PL_IFO", "Start Address of PR_IFO", and "Start Address of PL-IFO", respectively. The information piece "System_id" is a 32-bit signal representing the type of the present information structure. The information piece "TMG_IFO_length" is a 32-bit signal representing the whole manager length. The information piece "Num of PR_IFO" is an 8-bit signal representing the number of program information pieces "PR_IFO" which will be explained later. The information piece "Num of PL_IFO" is an 8-bit signal representing the number of after-recorded information pieces "PL_IFO" which will be explained later. The information piece "Start Address of PR_IFO" is a 32-bit signal representing the head address of a first program information piece "PR_IFO__0". The information piece "Start Address of PL_IFO" is a 32-bit signal representing the head address of a first after-recorded information piece "PL_IFO__0".

The second-level segment "CNTNT_IFO" in FIG. 9 contains third-level segments "PR_IFO__0", "PR_IFO__1", ..., and "PR_IFO_m" loaded with information pieces which relate to content programs (or AV multiplexing-resultant files) respectively. Furthermore, the second-level segment "CNTNT_IFO" contains third-level segments "PL_IFO__0", "PL_IFO__1", ..., and "PL_IFO_n" loaded with information pieces for after-recorded audio data which relate to the content programs (or the AV multiplexing-resultant files) respectively. For example, in the case where after-recorded audio data corresponding to the third-level segment "PR_IFO__0" are present, the third-level segment "PL_IFO__0" contains a fourth-level segment "PLAYL_IFO" loaded with information (play list information) relating to the after-recorded audio file.

Figure 11:
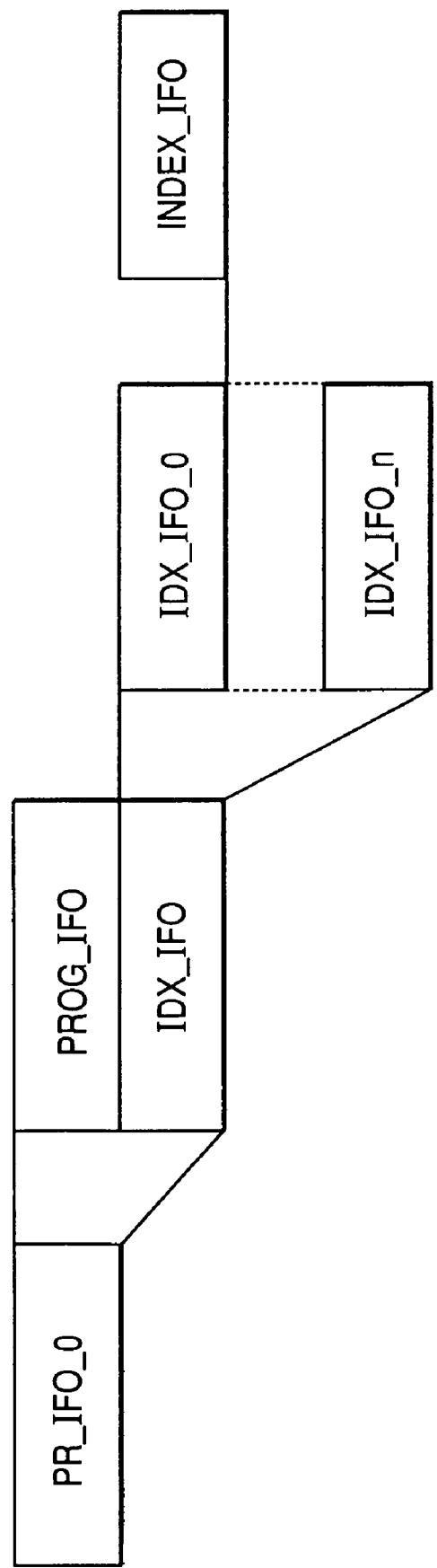
FIG. 11 is a diagram of the structure of a third-level segment "PR_IFO_0" in FIG. 9.

The third-level segments "PR_IFO__0", "PR_IFO__1", ..., and "PR_IFO_m" are similar in structure. Only the third-level segment "PR_IFO__0" will be explained in more detail. As shown in FIG. 11, the third-level segment "PR_IFO__0" contains fourth-level segments "PROG_IFO" and "IDX_IFO". The fourth-level segment "PROG_IFO" is loaded with content-program-related information. The fourth-level segment "IDX_IFO" contains fifth-level segments "IDX_IFO__0", "IDX_IFO__1", ..., and "IDX_IFO_n" loaded with information pieces which relate to respective indexes of the related audio-visual program. The fifth-level segments "IDX_IFO__0", "IDX_IFO__1", ..., and "IDX_IFO_n" are similar in structure. For example, the fifth-level segment "IDX_IFO__0" has a sixth-level segment "INDEX_IFO" in which a portion of the related audio-visual program can be registered as index information.

The fourth-level segment "PROG_IFO" is of a syntax structure shown in FIG. 12. Specifically, each fourth-level segment "PROG_IFO" includes information pieces having syntax names "Size of PROG_IFO", "PR number", "Content type", and "Component type", respectively. The information piece "Size of PROG_IFO" is a 32-bit signal representing the size of the present fourth-level segment "PROG_IFO". The information piece "PR number" is an 8-bit signal representing the designation number (the identification number) assigned to the related audio-visual program. The PR number is variable among "0"-"255" corresponding to different audio-visual programs respectively. The information piece "Content type" is an 8-bit signal representing the type of the related audio-visual program. The information piece "Component type" is an 8-bit signal representing the type of related data, that is, representing whether related data are of video, audio, or other.

As previously mentioned, in the presence of an after-recorded audio file, play list information "PLAYL_IFO" is provided. In the presence of "m" after-recorded audio files corresponding to the folder "PR0", list information pieces "AF0-1.dat", "AF0-2.dat", ..., "AF0-m.dat" are placed in the folder "PL0" as information for link with the after-recorded audio files.

The play list information "PLAYL_IFO" is of a syntax structure shown in FIG. 13. Specifically, the play list information "PLAYL_IFO" includes information pieces having syntax names "PR_number" and "AF_number" respectively. The information piece "PR_number" is an 8-bit signal representing the designation number (the identification number) assigned to the related main data, that is, the related audio-visual program. The information piece "AF_number" is an 8-bit signal representing the designation number (the identification number) assigned to the related after-recorded audio data.

Regarding each of "n" AV multiplexing-resultant streams "PRj.dat (j=0, 1, ..., n)" in the folders "PRj" of FIG. 8, "m" after-recorded audio data can be registered in accordance with user's request. When the number "m" is equal to "0", an AV multiplexing-resultant file is used without employing after-recorded audio data. When the number "m" is equal to "1" or greater, the recording of after-recording-purpose audio data is permitted. In this case, at least one after-recorded audio file is made and recorded. Also, the after-recorded audio data are reproduced or transmitted.

The index information "INDEX_IFO" in FIG. 11 is of a syntax structure in FIG. 14. Specifically, the index information "INDEX_IFO" includes information pieces having syntax names "INDEX number", "Playback Time", "Start Address", and "End Address", respectively. The information piece "INDEX number" is an 8-bit signal representing the serial number assigned to the related index. The information piece "Playback Time" is a 40-bit signal representing the playback time of the related index. The information piece "Start Address" is a 64-bit signal representing the address of the starting point of the related index. The information piece "End Address" is a 64-bit signal representing the address of the ending point of the related index.

Figure 15:
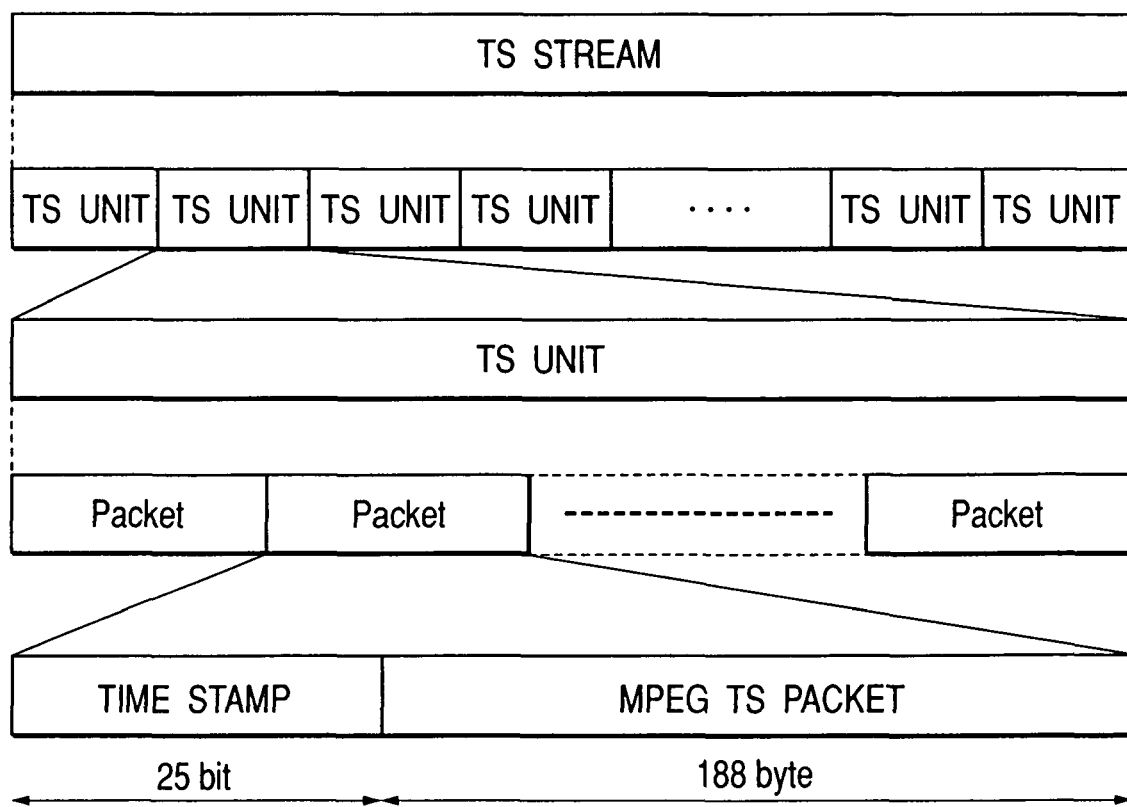
FIG. 15 is a diagram of the format of a transport stream (TS) recorded on a hard disk.

FIG. 15 shows the format of a TS recorded on a hard disk which constitutes the recording medium 108. As shown in FIG. 15, the TS is formed by a sequence of TS units. Each TS unit is composed of packets. Each packet is composed of a 25-bit time stamp and a 188-byte MPEG TS packet.

Figure 16:
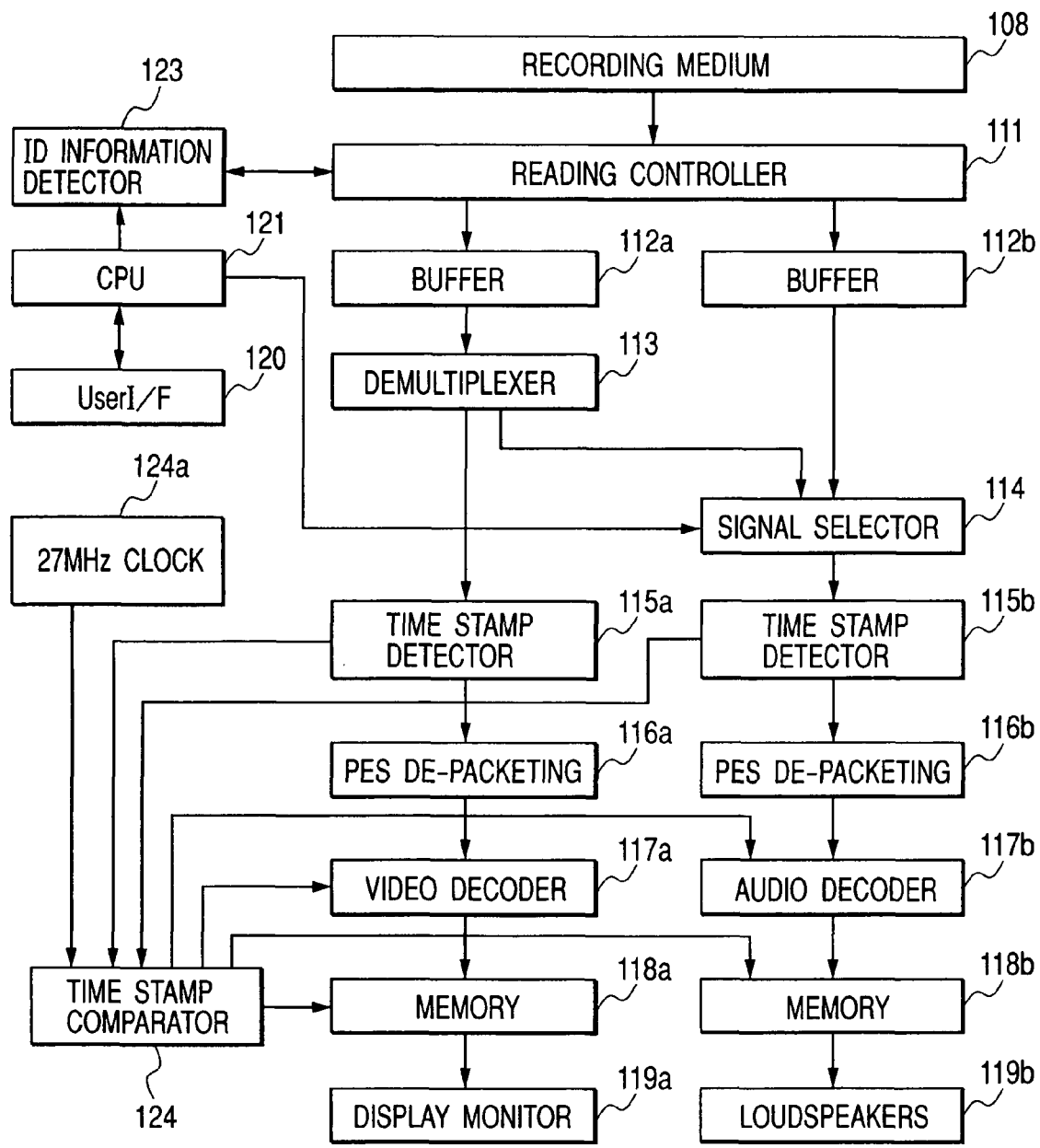
FIG. 16 is a block diagram of a reproducing apparatus in the first embodiment of this invention.

FIG. 16 shows a reproducing apparatus using the MPEG-system decoding apparatus of FIG. 3. As shown in FIG. 16, the reproducing apparatus includes a user interface 120 connected with a CPU 121. The user interface 120 can be handled by a user. The CPU 121 has a combination of an input/output port, a processing section, a ROM, and a RAM. The CPU 121 operates in accordance with a control program stored in the ROM or the RAM. The control program is designed to enable the CPU 121 to implement operation steps mentioned later. By handling the user interface 120, operation of the reproducing apparatus can be changed among different modes including a first mode and a second mode. The first operation mode is designed to reproduce main data (multiplexing-resultant data). The second operation mode is designed to reproduce after-recorded audio data instead of audio information in main data while synchronously reproducing video information in the main data. When the user interface 120 is handled, an operation-mode designation signal is inputted therefrom into the CPU 121. The operation-mode designation signal indicates which of the first operation mode and the second operation mode is desired. The CPU 121 transfers the operation-mode designation signal to a signal selector 114. Also, identification (ID) information can be inputted into the CPU 121 by handling the user interface 120. The CPU 121 transfers the identification information to an identification information detector 123.

When the operation-mode designation signal indicates that the first operation mode is desired, that is, when the reproduction of main data is desired, the reproducing apparatus operates as follows. A signal for identifying desired main data is inputted into the CPU 121 by handling the user interface 120. The identifying signal represents the designation number (the identification number) assigned to the desired main data. The CPU 121 transfers the identifying signal to the identification information detector 123. The identification information detector 123 derives the identification number of the desired main data from the identifying signal. The identification information detector 123 notifies the reading controller 111 of the identification number of the desired main data. The identification information detector 123 orders the reading controller 111 to read out, from a recording medium 108, a main-data file having a name corresponding to the identification number of the desired main data. Thus, the reading controller 111 implements the read-out of the desired main data from the recording medium 108. In this way, the reading controller 111 reads out desired main data, that is, desired multiplexing-resultant data, from the recording medium 108. The read-out main data are sent from the reading controller 111 to a buffer 112a. The main data are stored in the buffer 112a before being outputted therefrom to a demultiplexer 113. The demultiplexer 113 separates the main data into video data and audio data. The video data are sent from the demultiplexer 113 to a time stamp detector 115a. The audio data are sent from the demultiplexer 113 to the signal selector 114. The signal selector 114 selects the audio data from the demultiplexer 113 in response to the operation-mode designation signal, and passes the selected audio data to a time stamp detector 115b.

The time stamp detector 115a detects timing information (every PCR, every video PTS, and every video DTS) in the video data. The time stamp detector 115a sends the detected PCR, the detected video PTS, and the detected video DTS to a time stamp comparator 124. The time stamp detector 115a passes the video data to a PES de-packeting device 116a. The time stamp detector 115b detects timing information (every PCR, every audio PTS, and every audio DTS) in the audio data. The time stamp detector 115b sends the detected PCR, the detected audio PTS, and the detected audio DTS to the time stamp comparator 124. The time stamp detector 115b passes the audio data to a PES de-packeting device 116b.

The PES de-packeting device 116a de-packets the video data (a sequence of PES packets) to generate de-packeting-resultant video data. The PES de-packeting device 116a outputs the de-packeting-resultant video data to a video decoder 117a. The PES de-packeting device 116b de-packets the audio data (a sequence of PES packets) to generate de-packeting-resultant audio data. The PES de-packeting device 116b outputs the de-packeting-resultant audio data to an audio decoder 117b. The video decoder 117a implements the MPEG decoding of the video data to generate decoding-resultant video data. The video decoder 117a stores the decoding-resultant video data into a memory 118a. The audio decoder 117b implements the MPEG decoding of the audio data to generate decoding-resultant audio data. The audio decoder 117b stores the decoding-resultant audio data into a memory 118b.

A signal generator 124a outputs a 27-MHz clock signal to the time stamp comparator 124. On the basis of the 27-MHz clock signal, the time stamp comparator 124 generates a reference clock signal denoting reference clock time. The time stamp comparator 124 locks the frequency of the reference clock signal to a frequency indicated by the PCR. Therefore, the reference clock time is decided by the PCR. The time stamp comparator 124 compares time denoted by the video DTS with the reference clock time to decide whether or not the video DTS time agrees with the reference clock time. When the video DTS time agrees with the reference clock time, the time stamp comparator 124 enables the video decoder 117a to start the decoding of the video data originating from the PES packet having the related video DTS. The time stamp comparator 124 compares time denoted by the audio DTS with the reference clock time to decide whether or not the audio DTS time agrees with the reference clock time. When the audio DTS time agrees with the reference clock time, the time stamp comparator 124 enables the audio decoder 117b to start the decoding of the audio data originating from the PES packet having the related audio DTS.

The time stamp comparator 124 compares time denoted by the video PTS with the reference clock time to decide whether or not the video PTS time agrees with the reference clock time. When the video PTS time agrees with the reference clock time, the time stamp comparator 124 enables the memory 118a to output the decoding-resultant video data to a display monitor 119a for an indication purpose. The time stamp comparator 124 compares time denoted by the audio PTS with the reference clock time to decide whether or not the audio PTS time agrees with the reference clock time. When the audio PTS time agrees with the reference clock time, the time stamp comparator 124 enables the memory 118b to output the decoding-resultant audio data to loudspeakers 119b for a playback purpose. The video PTS and the audio PTS are preset so that the decoding-resultant video data and the decoding-resultant audio data can be synchronously played back.

When the operation-mode designation signal indicates that the second operation mode is desired, that is, when the reproduction of after-recorded audio data and main-data video information is desired, the reproducing apparatus operates as follows. Signals for identifying desired main data and desired after-recorded audio data are inputted into the CPU 121 by handling the user interface 120. The identifying signals correspond to information pieces "PR_number" and "AF_number" in FIG. 13 which represent the designation numbers (the identification numbers) assigned to the desired main data and the desired after-recorded audio data. The CPU 121 transfers the identifying signals to the identification information detector 123. The reading controller 111 reads out play list information "PLAYL_IFO" (see FIG. 13) from a recording medium 108, and sends the play list information "PLAYL_IFO" to the identification information detector 123. The identification information detector 123 detects the identification numbers of the desired main data and the desired after-recorded audio data in response to the identifying signals by referring to the play list information "PLAYL_IFO". The identification information detector 123 notifies the reading controller 111 of the identification numbers of the desired main data and the desired after-recorded audio data. The identification information detector 123 orders the reading controller 111 to alternately read out, from the recording medium 108, a main-data file and an after-recorded audio file having names corresponding to the identification numbers of the desired main data and the desired after-recorded audio data. Thus, the reading controller 111 implements the read-out of the desired main data and the desired after-recorded audio data from the recording medium 108 on an alternate time-sharing burst basis. The read-out main data are sent from the reading controller 111 to the buffer 112a. The main data are stored in the buffer 112a before being outputted therefrom to the demultiplexer 113. The demultiplexer 113 separates the main data into video data and audio data. The video data are sent from the demultiplexer 113 to the time stamp detector 115a. The audio data are sent from the demultiplexer 113 to the signal selector 114. The read-out after-recorded audio data are sent from the reading controller 111 to the buffer 112b. The after-recorded audio data are stored in the buffer 112b before being outputted therefrom to the signal selector 114. The signal selector 114 selects the after-recorded audio data from the buffer 112b in response to the operation-mode designation signal, and passes the selected after-recorded audio data to the time stamp detector 115b. In other words, the signal selector 114 rejects the audio data from the demultiplexer 113.

The time stamp detector 115a detects timing information (every PCR, every video PTS, and every video DTS) in the video data. The time stamp detector 115a sends the detected PCR, the detected video PTS, and the detected video DTS to the time stamp comparator 124. The time stamp detector 115a passes the video data to the PES de-packeting device 116a. The time stamp detector 115b detects timing information (every PCR, every audio PTS, and every audio DTS) in the after-recorded audio data. The time stamp detector 115b sends the detected PCR, the detected audio PTS, and the detected audio DTS to the time stamp comparator 124. The time stamp detector 115b passes the after-recorded audio data to the PES de-packeting device 116b.

The PES de-packeting device 116a de-packets the video data (a sequence of PES packets) to generate de-packeting-resultant video data. The PES de-packeting device 116a outputs the de-packeting-resultant video data to the video decoder 117a. The PES de-packeting device 116b de-packets the after-recorded audio data (a sequence of PES packets) to generate de-packeting-resultant audio data. The PES de-packeting device 116b outputs the de-packeting-resultant audio data to the audio decoder 117b. The video decoder 117a implements the MPEG decoding of the video data to generate decoding-resultant video data. The video decoder 117a stores the decoding-resultant video data into the memory 118a. The audio decoder 117b implements the MPEG decoding of the audio data to generate decoding-resultant audio data. The audio decoder 117b stores the decoding-resultant audio data into the memory 118b.

The signal generator 124a outputs the 27-MHz clock signal to the time stamp comparator 124. On the basis of the 27-MHz clock signal, the time stamp comparator 124 generates a reference clock signal denoting reference clock time. The time stamp comparator 124 locks the frequency of the reference clock signal to a frequency indicated by the PCR. Therefore, the reference clock time is decided by the PCR. The time stamp comparator 124 compares time denoted by the video DTS with the reference clock time to decide whether or not the video DTS time agrees with the reference clock time. When the video DTS time agrees with the reference clock time, the time stamp comparator 124 enables the video decoder 117a to start the decoding of the video data originating from the PES packet having the related video DTS. The time stamp comparator 124 compares time denoted by the audio DTS with the reference clock time to decide whether or not the audio DTS time agrees with the reference clock time. When the audio DTS time agrees with the reference clock time, the time stamp comparator 124 enables the audio decoder 117b to start the decoding of the audio data originating from the PES packet having the related audio DTS.

The time stamp comparator 124 compares time denoted by the video PTS with the reference clock time to decide whether or not the video PTS time agrees with the reference clock time. When the video PTS time agrees with the reference clock time, the time stamp comparator 124 enables the memory 118a to output the decoding-resultant video data to the display monitor 119a for an indication purpose. The time stamp comparator 124 compares time denoted by the audio PTS with the reference clock time to decide whether or not the audio PTS time agrees with the reference clock time. When the audio PTS time agrees with the reference clock time, the time stamp comparator 124 enables the memory 118b to output the decoding-resultant audio data to the loudspeakers 119b for a playback purpose. The video PTS and the audio PTS are preset so that the decoding-resultant video data and the decoding-resultant audio data (the after-recorded audio data) can be synchronously played back.

As previously mentioned, the CPU 121 is connected with the user interface 120. The CPU 121 can receive an operation-mode designation signal from the user interface 120. Also, the CPU 121 can receive identification (ID) information from the user interface 120. The CPU 121 responds to the operation-mode designation signal and the ID information. The CPU 121 is connected with the devices 111, 112a, 112b, 113, 114, 115a, 115b, 116a, 116b, 117a, 117b, 118a, 118b, 123, and 124. As previously mentioned, the CPU 121 has a combination of an input/output port, a processing section, a ROM, and a RAM. The CPU 121 operates in accordance with a control program stored in the ROM or the RAM. Preferably, the control program is transmitted into the CPU 121 from a recording medium. The control program may be downloaded into the CPU 121 via a communication network.

Figure 19:
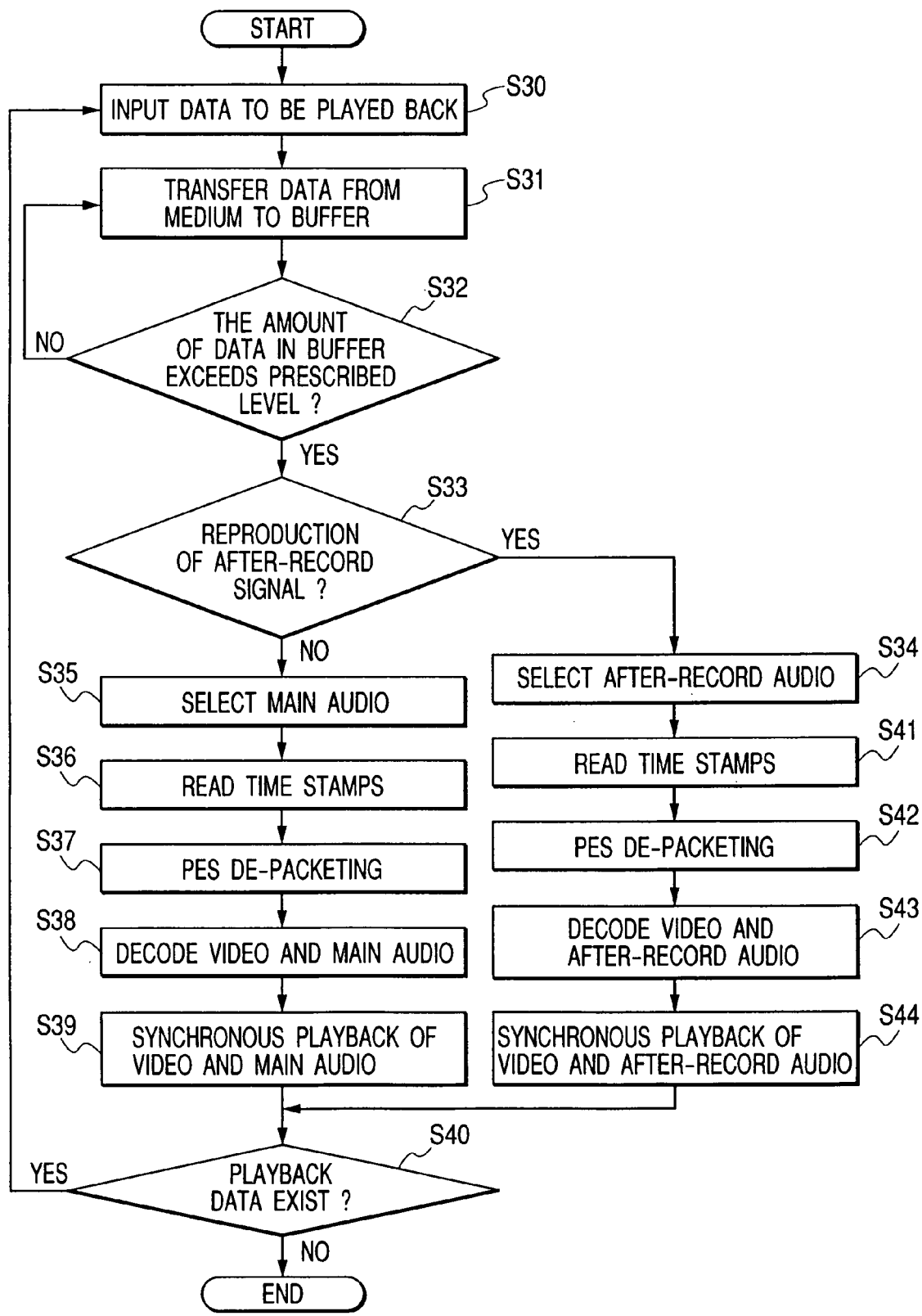
FIG. 19 is a flowchart of a segment of a control program for a CPU in FIG. 16.

FIG. 19 is a flowchart of a segment of the control program for the CPU 121. As shown in FIG. 19, a first step S30 controls the identification information detector 123 and the reading controller 111 to access desired main data (desired multiplexing-resultant data) or both desired main data and desired after-recorded audio data on a recording medium 108. After the step S30, the program advances to a step S31.

The step S31 controls the reading controller 111 to read out the desired main data or both the desired main data and the desired after-recorded audio data from the recording medium 108. The step S31 controls the reading controller 111 and the buffer 112a to store the read-out main data (the read-out multiplexing-resultant data) in the buffer 112a. In the presence of the desired after-recorded audio data, the step S31 controls the reading controller 111 and the buffer 112b to store the read-out after-recorded audio data in the buffer 112b.

A step S32 following the step S31 monitors the amount (the number of bits) of the multiplexing-resultant data in the buffer 112a. The step S32 decides whether or not the amount of the multiplexing-resultant data in the buffer 112a exceeds a first prescribed amount. In addition, the step S32 monitors the amount (the number of bits) of the after-recorded audio data in the buffer 112b. The step S32 decides whether or not the amount of the after-recorded audio data in the buffer 112b exceeds a second prescribed amount. In the case where the amount of the multiplexing-resultant data in the buffer 112a exceeds the first prescribed amount and also the amount of the after-recorded audio data in the buffer 112b exceeds the second prescribed amount, the program advances from the step S32 to a step S33. Otherwise, the program returns from the step S32 to the step S31.

The step S33 decides whether or not the after-recorded-data reproducing operation mode (the second operation mode) is desired by referring to an operation-mode designation signal outputted from the user interface 109. When the after-recorded data reproducing operation mode is desired, the program advances from the step S33 to a step S34. Otherwise, the program advances from the step S33 to a step S35.

The step S35 controls the buffer 112a to output the main data (the multiplexing-resultant data) to the demultiplexer 113. The step S35 controls the demultiplexer 113 to separate the main data into video data and audio data. The video data are sent from the demultiplexer 113 to the time stamp detector 115a. The audio data are sent from the demultiplexer 113 to the signal selector 114. The step S35 controls the signal selector 114 in response to the operation-mode designation signal so that the signal selector 114 selects the audio data from the demultiplexer 113 and passes the selected audio data to the time stamp detector 115b.

A step S36 following the step S35 controls the time stamp detector 115a to detect timing information (every PCR, every video PTS, and every video DTS) in the video data. The time stamp detector 115a sends the detected PCR, the detected video PTS, and the detected video DTS to the time stamp comparator 124. The time stamp detector 115a passes the video data to the PES de-packeting device 116a. The step S36 controls the time stamp detector 115b to detect timing information (every PCR, every audio PTS, and every audio DTS) in the audio data. The time stamp detector 115b sends the detected PCR, the detected audio PTS, and the detected audio DTS to the time stamp comparator 124. The time stamp detector 115b passes the audio data to the PES de-packeting device 116b.

A step S37 subsequent to the step S36 controls the PES de-packeting device 116a to de-packet the video data (a sequence of PES packets) to generate de-packeting-resultant video data. The PES de-packeting device 116a outputs the de-packeting-resultant video data to the video decoder 117a. The step S37 controls the PES de-packeting device 116b to de-packet the audio data (a sequence of PES packets) to generate de-packeting-resultant audio data. The PES de-packeting device 116b outputs the de-packeting-resultant audio data to the audio decoder 117b.

A step S38 following the step S37 controls the video decoder 117a to implement the MPEG decoding of the video data to generate decoding-resultant video data. The video decoder 117a stores the decoding-resultant video data into the memory 118a. The step S38 controls the audio decoder 117b to implement the MPEG decoding of the audio data to generate decoding-resultant audio data. The audio decoder 117b stores the decoding-resultant audio data into the memory 118b.

A step S39 subsequent to the step S38 implements synchronous playback of the decoding-resultant video data and the decoding-resultant audio data. Specifically, the step S39 controls the time stamp comparator 124 to decide reference clock time in response to the PCR. The step S39 controls the time stamp comparator 124 to compare time denoted by the video DTS with the reference clock time, and thereby to decide whether or not the video DTS time agrees with the reference clock time. When the video DTS time agrees with the reference clock time, the time stamp comparator 124 enables the video decoder 117a to start the decoding of the video data originating from the PES packet having the related video DTS. The step S39 controls the time stamp comparator 124 to compare time denoted by the audio DTS with the reference clock time, and thereby to decide whether or not the audio DTS time agrees with the reference clock time. When the audio DTS time agrees with the reference clock time, the time stamp comparator 124 enables the audio decoder 117b to start the decoding of the audio data originating from the PES packet having the related audio DTS.

The step S39 controls the time stamp comparator 124 to compare time denoted by the video PTS with the reference clock time, and thereby to decide whether or not the video PTS time agrees with the reference clock time. When the video PTS time agrees with the reference clock time, the time stamp comparator 124 enables the memory 118a to output the decoding-resultant video data to the display monitor 119a for an indication purpose. The step S39 controls the time stamp comparator 124 to compare time denoted by the audio PTS with the reference clock time, and thereby to decide whether or not the audio PTS time agrees with the reference clock time. When the audio PTS time agrees with the reference clock time, the time stamp comparator 124 enables the memory 118b to output the decoding-resultant audio data to the loudspeakers 119b for a playback purpose. The video PTS and the audio PTS are preset so that the decoding-resultant video data and the decoding-resultant audio data can be synchronously played back. After the step S39, the program advances to a step S40.

The step S34 controls the buffer 112a to output the main data (the multiplexing-resultant data) to the demultiplexer 113. The step S34 controls the demultiplexer 113 to separate the main data into video data and audio data. The video data are sent from the demultiplexer 113 to the time stamp detector 115a. The audio data are sent from the demultiplexer 113 to the signal selector 114. The step S34 controls the buffer 112b to output the after-recorded audio data to the signal selector 114. The step S34 controls the signal selector 114 in response to the operation-mode designation signal so that the signal selector 114 selects the after-recorded audio data from the buffer 112b and passes the selected after-recorded audio data to the time stamp detector 115b.

A step S41 following the step S34 controls the time stamp detector 115a to detect timing information (every PCR, every video PTS, and every video DTS) in the video data. The time stamp detector 115a sends the detected PCR, the detected video PTS, and the detected video DTS to the time stamp comparator 124. The time stamp detector 115a passes the video data to the PES de-packeting device 116a. The step S41 controls the time stamp detector 115b to detect timing information (every PCR, every audio PTS, and every audio DTS) in the after-recorded audio data. The time stamp detector 115b sends the detected PCR, the detected audio PTS, and the detected audio DTS to the time stamp comparator 124. The time stamp detector 115b passes the after-recorded audio data to the PES de-packeting device 116b.

A step S42 subsequent to the step S41 controls the PES de-packeting device 116a to de-packet the video data (a sequence of PES packets) to generate de-packeting-resultant video data. The PES de-packeting device 116a outputs the de-packeting-resultant video data to the video decoder 117a. The step S42 controls the PES de-packeting device 116b to de-packet the after-recorded audio data (a sequence of PES packets) to generate de-packeting-resultant audio data. The PES de-packeting device 116b outputs the de-packeting-resultant audio data to the audio decoder 117b.

A step S43 following the step S42 controls the video decoder 117a to implement the MPEG decoding of the video data to generate decoding-resultant video data. The video decoder 117a stores the decoding-resultant video data into the memory 118a. The step S43 controls the audio decoder 117b to implement the MPEG decoding of the audio data to generate decoding-resultant audio data. The audio decoder 117b stores the decoding-resultant audio data into the memory 118b.

A step S44 subsequent to the step S43 implements synchronous playback of the decoding-resultant video data and the decoding-resultant audio data (the after-recorded audio data). Specifically, the step S44 controls the time stamp comparator 124 to decide reference clock time in response to the PCR. The step S44 controls the time stamp comparator 124 to compare time denoted by the video DTS with the reference clock time, and thereby to decide whether or not the video DTS time agrees with the reference clock time. When the video DTS time agrees with the reference clock time, the time stamp comparator 124 enables the video decoder 117a to start the decoding of the video data originating from the PES packet having the related video DTS. The step S44 controls the time stamp comparator 124 to compare time denoted by the audio DTS with the reference clock time, and thereby to decide whether or not the audio DTS time agrees with the reference clock time. When the audio DTS time agrees with the reference clock time, the time stamp comparator 124 enables the audio decoder 117b to start the decoding of the audio data originating from the PES packet having the related audio DTS.

The step S44 controls the time stamp comparator 124 to compare time denoted by the video PTS with the reference clock time, and thereby to decide whether or not the video PTS time agrees with the reference clock time. When the video PTS time agrees with the reference clock time, the time stamp comparator 124 enables the memory 118a to output the decoding-resultant video data to the display monitor 119a for an indication purpose. The step S44 controls the time stamp comparator 124 to compare time denoted by the audio PTS with the reference clock time, and thereby to decide whether or not the audio PTS time agrees with the reference clock time. When the audio PTS time agrees with the reference clock time, the time stamp comparator 124 enables the memory 118b to output the decoding-resultant audio data to the loudspeakers 119b for a playback purpose. The video PTS and the audio PTS are preset so that the decoding-resultant video data and the decoding-resultant audio data (the after-recorded audio data) can be synchronously played back. After the step S44, the program advances to the step S40.

The step S40 decides whether or not remaining desired data to be played back exist. When remaining desired data exist, the program returns from the step S40 to the step S30. Otherwise, the program advances from the step S40, and then the current execution cycle of the program segment ends.

Figure 17:
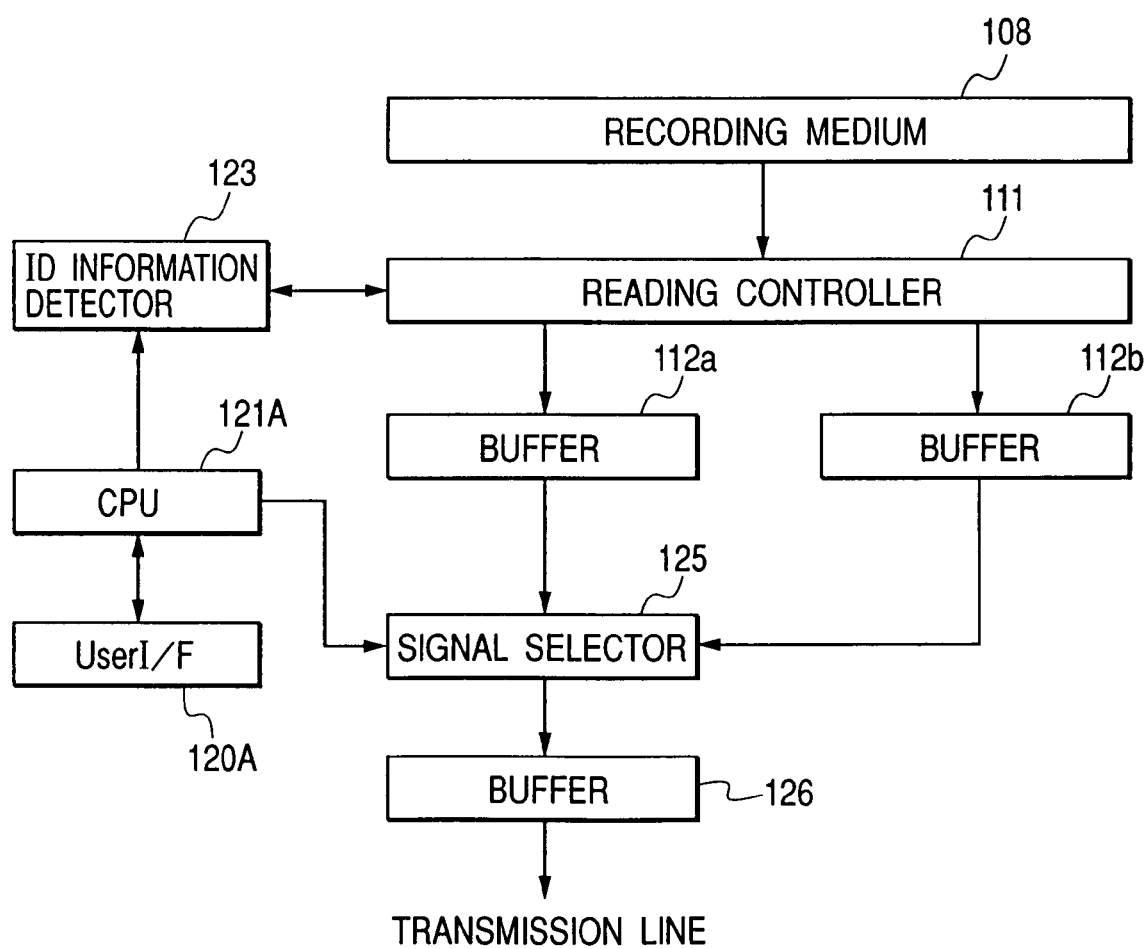
FIG. 17 is a block diagram of a transmission apparatus in the first embodiment of this invention.

FIG. 17 shows a transmission apparatus. As shown in FIG. 17, the transmission apparatus includes a user interface 120A connected with a CPU 121A. The user interface 120A can be handled by a user. The CPU 121A has a combination of an input/output port, a processing section, a ROM, and a RAM. The CPU 121A operates in accordance with a control program stored in the ROM or the RAM. The control program is designed to enable the CPU 121A to implement operation steps mentioned later. By handling the user interface 120A, operation of the transmission apparatus can be changed among different modes including a first mode and a second mode. The first operation mode is designed to transmit main data (multiplexing-resultant data). The second operation mode is designed to transmit after-recorded audio data instead of audio information in main data while transmitting video information in the main data. When the user interface 120A is handled, an operation-mode designation signal is inputted therefrom into the CPU 121A. The operation-mode designation signal indicates which of the first operation mode and the second operation mode is desired. The CPU 121A transfers the operation-mode designation signal to a signal selector 125. Also, identification (ID) information can be inputted into the CPU 121A by handling the user interface 120A. The CPU 121A transfers the identification information to an identification information detector 123.

When the operation-mode designation signal indicates that the first operation mode is desired, that is, when the transmission of main data is desired, the transmission apparatus operates as follows. A reading controller 111 reads out main data, that is, multiplexing-resultant data, from a recording medium 108. The read-out main data are sent from the reading controller 111 to a buffer 112a. The main data are stored in the buffer 112a before being outputted therefrom to the signal selector 125. The signal selector 125 selects the main data from the buffer 112a, and passes the main data to a buffer 126. The main data are stored in the buffer 126 before being outputted therefrom to a transmission line.

When the operation-mode designation signal indicates that the second operation mode is desired, that is, when the transmission of after-recorded audio data and main-data video information is desired, the transmission apparatus operates as follows. Signals for identifying desired main data and desired after-recorded audio data are inputted into the CPU 121A by handling the user interface 120A. The identifying signals correspond to information pieces "PR_number" and "AF_number" in FIG. 13 which represent the designation numbers (the identification numbers) assigned to the desired main data and the desired after-recorded audio data. The CPU 121A transfers the identifying signals to the identification information detector 123. The reading controller 111 reads out play list information "PLAYL_IFO" from a recording medium 108. The reading controller 111 sends the play list information "PLAYL_IFO" to the identification information detector 123. The identification information detector 123 detects the identification numbers of the desired main data and the desired after-recorded audio data in response to the identifying signals by referring to the play list information "PLAYL_IFO" (see FIG. 13). The identification information detector 123 notifies the reading controller 111 of the identification numbers of the desired main data and the desired after-recorded audio data. The identification information detector 123 orders the reading controller 111 to alternately read out, from the recording medium 108, a main-data file and an after-recorded audio file having names corresponding to the identification numbers of the desired main data and the desired after-recorded audio data. Thus, the reading controller 111 implements the read-out of the desired main data and the desired after-recorded audio data from the recording medium 108 on an alternate time-sharing burst basis. The read-out main data are sent from the reading controller 111 to the buffer 112a. The main data are stored in the buffer 112a before being outputted therefrom to the signal selector 125. The read-out after-recorded audio data are sent from the reading controller 111 to the buffer 112b. The after-recorded audio data are stored in the buffer 112b before being outputted therefrom to the signal selector 125. The signal selector 125 replaces audio data in the main data with the after-recorded audio data from the buffer 112b in response to the operation-mode designation signal, and thereby converts the original main data into new main data. The new main data are sent from the signal selector 125 to the buffer 126. The new main data are stored in the buffer 126 before being outputted therefrom to the transmission line. During the conversion of the original main data into the new main data, it is unnecessary to alter every PCR, every DTS, and every PTS. Preferably, the signal selector 125 includes a calculator. The calculator may be formed by the CPU 121A. For packets of the new main data which have been subjected to audio-data replacement, the calculator computes new CRC (cyclic redundancy check) code words and replaces old CRC code words with the new ones.

As understood from the previous description, regarding the generation of main data, it is supposed that a data piece related to the type of after-recording-purpose audio data is previously produced in element data, and that the transmission rate of the after-recording-purpose audio data is equal to that of original audio data in the main data.

Second Embodiment

A second embodiment of this invention is similar to the first embodiment thereof except for design changes mentioned later. According to the first embodiment of this invention, regarding the generation of main data, it is supposed that a data piece related to the type of after-recording-purpose audio data is previously produced in element data, and that the transmission rate of the after-recording-purpose audio data is equal to that of original audio data in the main data. According to the second embodiment of this invention, regarding the generation of main data, element data equal in transmission rate to expected after-recording-purpose audio data are previously recorded on a multiplexed basis as dummy data.

Third Embodiment

A third embodiment of this invention is similar to the first embodiment thereof except for design changes mentioned later. According to the third embodiment of this invention, in the case where after-recording-purpose audio data are expected to be recorded, element data equal in transmission rate to the expected after-recording-purpose audio data are previously recorded on a multiplexed basis as dummy data. When actual after-recording-purpose audio data are generated, the previously-recorded dummy data are replaced with the actual after-recording-purpose audio data. During the replacement of the previously-recorded dummy data with the actual after-recording-purpose audio data, it is unnecessary to alter every PCR, every DTS, and every PTS.

In the case where the transmission rate of actual after-recording-purpose audio data differs from the expected transmission rate, video data and the actual after-recording-purpose audio data are recorded on a multiplexed basis. In this case, it is necessary to renew every PCR, every DTS, and every PTS.

Advantages Provided by Embodiments

The first, second, and third embodiments of this invention provide the following advantages.

An audio signal and a video signal are compressively encoded into encoding-resultant audio data and encoding-resultant video data. An audio time stamp for synchronous reproduction is recorded in every unit of the encoding-resultant audio data while a video time stamp for synchronous reproduction is recorded in every unit of the encoding-resultant video data. The encoding-resultant audio data and the encoding-resultant video data are multiplexed into main data. The main data are recorded on a recording medium. One or more types of after-recording-purpose data for either the encoding-resultant audio data or the encoding-resultant video data are also recorded on the recording medium separately from the recorded main data. Thus, the after-recording-purpose data are recorded without being multiplexed. Accordingly, it is possible to provide a format for easily recording after-recording-purpose data. Furthermore, it is possible to record many types of after-recording-purpose data.

An audio signal and a video signal are compressively encoded into encoding-resultant audio data and encoding-resultant video data. An audio time stamp for synchronous reproduction is recorded in every unit of the encoding-resultant audio data while a video time stamp for synchronous reproduction is recorded in every unit of the encoding-resultant video data. The encoding-resultant audio data and the encoding-resultant video data are multiplexed into main data. The main data are recorded on a recording medium. One or more types of after-recording-purpose data for either the encoding-resultant audio data or the encoding-resultant video data are also recorded on the recording medium separately from the recorded main data. Thus, the after-recording-purpose data are recorded without being multiplexed. The after-recording-purpose data are read out from the recording medium on a time sharing basis before being reproduced. Accordingly, it is possible to easily identify the types of the after-recording-purpose data. Furthermore, it is possible to reproduce the after-recording-purpose data without multiplexing them again.

An audio signal and a video signal are compressively encoded into encoding-resultant audio data and encoding-resultant video data. An audio time stamp for synchronous reproduction is recorded in every unit of the encoding-resultant audio data while a video time stamp for synchronous reproduction is recorded in every unit of the encoding-resultant video data. The encoding-resultant audio data and the encoding-resultant video data are multiplexed into main data. The main data are recorded on a recording medium. One or more types of after-recording-purpose data for either the encoding-resultant audio data or the encoding-resultant video data are also recorded on the recording medium separately from the recorded main data. Thus, the after-recording-purpose data are recorded without being multiplexed. The main data and the after-recording-purpose data are read out from the recording medium on a time sharing basis. The after-recording-purpose data replace corresponding element data in the main data so that the main data are converted into new main data. The new main data are transmitted. Accordingly, it is possible to transmit data in conformity with the MEG standards for multiplexing. An MPEG reproducer in a transmission destination can reproduce the transmitted data containing the after-recording-purpose data.

In the case where after-recording-purpose data are recorded on a recording medium, recorded main data on the recording medium remain unchanged. Accordingly, it is possible to reproduce the main data as they are. In the case where after-recording-purpose data are reproduced from a recording medium before being transmitted, recorded main data on the recording medium remain unchanged. Accordingly, it is possible to reproduce the main data as they are. In the case where a plurality of types of after-recording-purpose data are recorded on a recording medium, a user can selectively enjoy one or more of the types of after-recording-purpose data.

There are identification information pieces for identifying a plurality of types of after-recording-purpose data, respectively. Time stamps for reproduction synchronous with main data, and the identification information pieces are added to the plurality of types of after-recording-purpose data. Each of the types of after-recording-purpose data is made into a bit stream without being multiplexed with the main data.

Accordingly, the main data remain unchanged. Thus, even in the case where main data and after-recording-purpose data are recorded on a recording medium, it is possible to reproduce the main data from the recording medium as they are. In the case where main data and a plurality of types of after-recording-purpose data are recorded on a recording medium, it is possible to selectively reproduce one of the types of after-recording-purpose data instead of the main data to convert the main data into new main data.

What is claimed is:

1. An after-recording method comprising:
 first step for compressively encoding an audio signal into encoding-resultant audio data divided in units;
 second step for compressively encoding a video signal into encoding-resultant video data by using MPEG encoding method divided in units;
 third step for adding an audio time stamp for audio-video synchronous reproduction to every unit of the encoding-resultant audio data generated by the first means to generate time-stamp-added audio data;
 fourth step for adding a video time stamp for audio-video synchronous reproduction to every unit of the encoding-resultant video data generated by the second means to generate time-stamp-added video data;
 fifth step for multiplexing the time-stamp-added audio data generated by the third means and the time-stamp-added video data generated by the fourth means into main data by using MPEG system multiplexing method;
 sixth step for, to first after-recording-purpose encoding-resultant data for at least one of the encoding-resultant audio data generated by the first step and the encoding-resultant video data generated by the second step which form the main data, adding a time stamp for reproduction synchronous with a portion of the main data and identification information for identifying the first after-recording-purpose encoding-resultant data to convert the encoding-resultant audio data in main data into after-recording-purpose encoding-resultant data; and
 seventh step for recording the main data, the after-recording-purpose encoding-resultant data, and play list information on a recording medium, the play list information by number of play items providing link between the main data and the after-recording-purpose encoding-resultant data.

* * * * *